US009403089B2

(12) United States Patent
Borst et al.

(10) Patent No.: US 9,403,089 B2
(45) Date of Patent: Aug. 2, 2016

(54) SYSTEM AND METHOD FOR LIMITING THE NUMBER OF CHARACTERS DISPLAYED IN A COMMON AREA

(75) Inventors: Karl Joseph Borst, North York (CA); John Alexander Larsen, Toronto (CA)

(73) Assignee: GANZ, Woodbridge (CA)

( * ) Notice: Subject to any disclaimer, the term of this patent is extended or adjusted under 35 U.S.C. 154(b) by 1565 days.

(21) Appl. No.: 13/055,276

(22) PCT Filed: Aug. 31, 2010

(86) PCT No.: PCT/CA2010/001343
§ 371 (c)(1),
(2), (4) Date: Jan. 21, 2011

(87) PCT Pub. No.: WO2011/022841
PCT Pub. Date: Mar. 3, 2011

(65) Prior Publication Data
US 2011/0201423 A1    Aug. 18, 2011

Related U.S. Application Data

(60) Provisional application No. 61/238,432, filed on Aug. 31, 2009, provisional application No. 61/257,204, filed on Nov. 2, 2009, provisional application No. 61/327,364, filed on Apr. 23, 2010.

(51) Int. Cl.
*A63F 9/24*     (2006.01)
*A63F 13/30*   (2014.01)

(52) U.S. Cl.
CPC ........... *A63F 13/12* (2013.01); *A63F 2300/308* (2013.01); *A63F 2300/572* (2013.01)

(58) Field of Classification Search
CPC .............. A63F 2300/572; A63F 2300/5553; G06N 3/006; H04L 67/306
USPC ....................................................... 463/16, 42
IPC ............................ A63F 2300/553; G06N 3/006
See application file for complete search history.

(56) References Cited

U.S. PATENT DOCUMENTS 5,736,982 A    4/1998    Suzuki et al.
5,880,731 A    3/1999    Liles et al.

(Continued)

FOREIGN PATENT DOCUMENTS

JP    2001-321571 A    11/2001
JP    2001-522498 A    11/2001

(Continued)

OTHER PUBLICATIONS

International Search Report for PCT/CA2010/001343, dated Nov. 25, 2010.

(Continued)

*Primary Examiner* — Reginald Renwick
(74) *Attorney, Agent, or Firm* — Pearne & Gordon LLP

(57) ABSTRACT

A system providing a graphical chat room and/or virtual world on a website in which users can control avatars or other characters to participate in activities and interact with other users' avatars/characters. The chat room or virtual world has a large common location where a large number of users might participate with their characters/avatars, but where because display of all of the participants and/or all of the area becomes impractical or otherwise unwieldy, the system determines an appropriate portion of the area and a limited number of avatars/characters to display based on some criteria.

15 Claims, 24 Drawing Sheets

(56) References Cited

U.S. PATENT DOCUMENTS

| | | | |
|---|---|---|---|
| 5,926,179 A | 7/1999 | Matsuda et al. | |
| 5,956,038 A | 9/1999 | Rekimoto | |
| 6,081,830 A | 6/2000 | Schindler | |
| 6,219,045 B1 * | 4/2001 | Leahy et al. | 715/757 |
| 6,253,167 B1 | 6/2001 | Matsuda et al. | |
| 6,268,872 B1 | 7/2001 | Matsuda et al. | |
| 6,349,301 B1 | 2/2002 | Mitchell et al. | |
| 6,396,509 B1 | 5/2002 | Cheng | |
| 6,476,830 B1 | 11/2002 | Farmer et al. | |
| 6,493,001 B1 | 12/2002 | Takagi et al. | |
| 6,519,771 B1 | 2/2003 | Zenith | |
| 6,559,863 B1 | 5/2003 | Megiddo | |
| 6,650,761 B1 | 11/2003 | Rodriguez et al. | |
| 6,662,231 B1 | 12/2003 | Drosset et al. | |
| 6,734,884 B1 | 5/2004 | Berry et al. | |
| 6,734,885 B1 | 5/2004 | Matsuda | |
| 6,758,746 B1 | 7/2004 | Hunter et al. | |
| 6,772,195 B1 | 8/2004 | Hatlelid et al. | |
| 6,910,186 B2 | 6/2005 | Kim | |
| 6,948,131 B1 | 9/2005 | Neven et al. | |
| 7,012,602 B2 | 3/2006 | Watson et al. | |
| 7,058,897 B2 | 6/2006 | Matsuda | |
| 7,062,722 B1 | 6/2006 | Carlin et al. | |
| 7,086,005 B1 | 8/2006 | Matsuda | |
| 7,139,796 B2 | 11/2006 | Rekimoto et al. | |
| 7,143,358 B1 | 11/2006 | Yuen | |
| 7,155,680 B2 | 12/2006 | Akazawa et al. | |
| 7,181,690 B1 | 2/2007 | Leahy et al. | |
| 7,210,104 B2 | 4/2007 | Nakagawa | |
| 7,288,028 B2 | 10/2007 | Rodriquez et al. | |
| 7,342,587 B2 | 3/2008 | Danzig et al. | |
| 7,396,281 B2 | 7/2008 | Mendelsohn et al. | |
| 7,412,526 B2 | 8/2008 | Fujisawa | |
| 7,493,558 B2 | 2/2009 | Leahy et al. | |
| 7,587,338 B2 | 9/2009 | Owa | |
| 7,603,406 B2 | 10/2009 | Gulliver et al. | |
| 7,823,074 B2 | 10/2010 | Takemura et al. | |
| 8,118,673 B2 | 2/2012 | Coleman et al. | |
| 2001/0020955 A1 | 9/2001 | Nakagawa | |
| 2002/0040327 A1 | 4/2002 | Owa | |
| 2002/0054094 A1 | 5/2002 | Matsuda | |
| 2002/0198940 A1 | 12/2002 | Bower et al. | |
| 2003/0055984 A1 | 3/2003 | Shimakawa et al. | |
| 2003/0065721 A1 | 4/2003 | Roskind | |
| 2004/0148424 A1 | 7/2004 | Berkson et al. | |
| 2004/0189702 A1 | 9/2004 | Hlavac et al. | |
| 2006/0123127 A1 | 6/2006 | Littlefield | |
| 2006/0209068 A1 | 9/2006 | Ajioka et al. | |
| 2006/0224971 A1 | 10/2006 | Paulin et al. | |
| 2007/0050716 A1 | 3/2007 | Leahy et al. | |
| 2007/0063999 A1 * | 3/2007 | Park | 345/419 |
| 2007/0288602 A1 | 12/2007 | Sundaresan | |
| 2008/0040428 A1 | 2/2008 | Wei | |
| 2008/0163379 A1 | 7/2008 | Robinson et al. | |
| 2008/0215974 A1 | 9/2008 | Harrison et al. | |
| 2008/0215994 A1 * | 9/2008 | Harrison et al. | 715/757 |
| 2008/0221998 A1 | 9/2008 | Mendelsohn et al. | |
| 2008/0250332 A1 | 10/2008 | Farrell et al. | |
| 2009/0125819 A1 | 5/2009 | Hamilton, II et al. | |
| 2009/0144638 A1 | 6/2009 | Haggar et al. | |
| 2009/0204420 A1 | 8/2009 | Ganz | |
| 2009/0254843 A1 | 10/2009 | Van Wie et al. | |
| 2010/0060662 A1 | 3/2010 | Law | |
| 2010/0287182 A1 | 11/2010 | Brooks et al. | |

FOREIGN PATENT DOCUMENTS

| | | |
|---|---|---|
| JP | 2002-055935 A | 2/2002 |
| WO | 99/42917 A1 | 8/1999 |
| WO | 01/33327 A1 | 5/2001 |
| WO | 2006/128224 A1 | 12/2006 |
| WO | 2007/101785 A1 | 9/2007 |

OTHER PUBLICATIONS

Canadian Office action—CA2717708—Dec. 23, 2010.
Intl Search Report—PCT-CA2009-000271 Sep. 7, 2010.
Evaluation Personal Agent—Matsuda (Apr. 2001).

* cited by examiner

SYSTEM AND METHOD FOR LIMITING THE NUMBER OF CHARACTERS DISPLAYED IN A COMMON AREA

CROSS-REFERENCE TO RELATED APPLICATION

This application claims the benefit of U.S. Provisional Application Ser. No. 61/238,432, entitled LIMITING THE NUMBER OF AVATARS DISPLAYED IN A CHAT ROOM and filed on Aug. 31, 2009, incorporated herein by reference. This application also claims the benefit of U.S. Provisional Application Ser. No. 61/257,204 filed on Nov. 2, 2009 and entitled VIRTUAL TRASH COLLECTION ACTIVITY, incorporated herein by reference. This application also claims the benefit of U.S. Provisional Application Ser. No. 61/327,364 filed on Apr. 23, 2010 and entitled INTELLIGENT USER FILTERING, incorporated herein by reference.

FIELD OF THE INVENTION

The present invention relates generally to a system providing a graphical chat room and/or virtual world on a website in which users can control avatars or other characters to participate in activities and interact with other users' avatars/characters. More specifically, the invention relates to such a chat room or virtual world having a common location where a large number of users might participate, but where display of all of the participants and/or all of the area becomes impractical or otherwise unwieldy. This invention can be implemented, for example, on any suitable website including a common area, graphical chat room and/or a virtual world, such as the one described in U.S. Pat. No. 7,677,948 to Ganz, which is herein incorporated by reference in its entirety.

BACKGROUND OF THE INVENTION

The Internet has become a common resource for entertainment seekers. Through various entertainment websites, virtual communities have been established that allow users to create a virtual or online reality for themselves. Chatrooms are provided where users are represented by avatars to chat, or otherwise interact, with the avatars of other users. Computer games have also crossed over into the online world, allowing users to play against or along with each other from the comfort of their own personal Internet connections located across town or across the country. When it comes to most online entertainment activities including gaming and virtual communities, a disconnection unfortunately exists between objects in the real world and objects in the online world.

More recently, entertainment websites have been developed in which the website content is directly tied to a product that is purchased by a user. For example, as disclosed in United States Patent Application Publication No. 2005/0192864 to Ganz, incorporated herein by reference, a user purchases a toy that includes a secret code provided in the toy packaging. Access to a certain interactive content on the website provided by the website provider, such as the manufacturer of the toy or some other provider, is restricted to users who purchase a toy. When the user carries out a registration process on the website, which involves entering the secret code, a virtual world is presented to the user. The virtual world includes a virtual toy character corresponding to the toy purchased by the user. The user can participate in various interactive activities involving the virtual toy. The user may then purchase additional toys and enter the secret codes provided with those toys to add additional virtual toys to the virtual world. These virtual toys can interact with each other, thereby enhancing the user's entertainment experiences.

Due to the tremendous popularity of the above described online activities, the number of participants in a particular activity or location can grow so large that it can be difficult, unwieldy, or even impossible to display all of the avatars, characters, or other items that are currently participating in the activity or location. Furthermore, the location or activity area may be so large, that not all of it can be displayed on the user's display. Some means of managing such user's display in a manner satisfactory to the user but manageable by the system is therefore desirable.

SUMMARY OF THE INVENTION

According to an aspect of the present invention a computerized system provides a graphical representation of a chat room or some other common area, such as a virtual park, in which multiple avatars or virtual characters can interact. While the user is visiting the common area with his avatar or character (or other virtual item), the system is limited to displaying only a certain number of such items, such as, for example, 30 (or another designated quantity), in a user's viewing area (including the user's own avatar/character). Furthermore, the system may display only a subset (portion) of the common area as the viewing area displayed on the user's display.

For example, in a system where user's have virtual pets visiting a park, the system may limit the user's view of the park to a quarter of the park, and only show 30 total pets (the user's pet, and 29 other users' pets). Normally, only one portion or section of the park is visible within the user's view a one time, and the user can scroll around the park (such as by "walking the pet") to view other sections. When the user is about to go into a new section, the system counts the number of pets in that section. If there are more than 29 other pets in that section, the system uses an algorithm to pick 29 pets to display to the user and hides the rest.

In the example, the system may pick which pets to view based on predetermined prioritized criteria. For example: 1) Up to 29 pets will be selected from the user's "friends list" (a list of users that the given user has chosen at some point in advance), if they are located within the user's current viewing area. 2) Any remaining spots (of the 29 available) could be randomly selected by the system from the pets in the user's current viewing area (or based on some other criteria). 3) Once 29 pets are selected, the system tracks only these pets for a predetermined time (e.g., 2 minutes, or another designated period of time). In the example, every two minutes, the system stops tracking any pets that are no longer in the user's viewing area, repeats the selection process and begins tracking up to 29 pets in the user's current viewing area (if there are still more than 29) according to the above criteria. Once there are fewer than 30 pets in the user's viewing area, then the system can show all of the pets.

According to another aspect of the present invention, a chat room (or other common area) includes a virtual throwing and catching system that allows characters or avatars in the park to pick up a ball and play catch with another user's avatar/character. For example, when the avatar/character is virtually holding the ball, it is displayed hovering over the avatar/character. If the receiving avatar/character moves after the ball is thrown, the ball drops onto the ground. Further, during throwing, the ball is displayed in a parabolic path, traveling from one avatar/character to another. Randomly, for a predetermined percentage of throws (e.g. 10% of the time), an avatar/character will accidentally drop the ball, giving the virtual throwing and catching system more realism.

According to another aspect of the present invention, a chat room or other common area includes a virtual ice cream seller that only a certain percentage of avatars/characters can visit at any given time. The virtual ice cream seller appears randomly, and the flavors of ice cream sold each time are randomly selected by the system.

According to another aspect of the present invention, the website contains a number of different chat rooms and/or common areas. A scripted chatting system can be used, such that users can only transmit pre-scripted messages to other users (i.e. free typing of text is not permitted). While in the area, pre-scripted messages are provided that are specific to the part and are different from the pre-scripted messages available when chatting in other areas on the website.

According to another aspect of the invention, an animated virtual item, also known as a multi-function item, is provided in the chat room or common area. The multi-function item has more than one state. For example, a teeter totter has a static state (when only one pet is sitting on it) and an animated state (when two pets are on).

According to another aspect of the invention, one or more virtual multi-state items, such as campfires, for example, are provided in the area. The system randomly assigns states to the items. For example, a campfire may be a roaring fire, be mere hot embers (perhaps smoky or not), or be burned out.

According to an aspect of the present invention, a computerized system provides a graphical representation of a chat room or other common area, such as a virtual park, in which multiple avatars or virtual characters can interact. While the user is visiting the park, the user can participate in a virtual trash collection activity or game in which users are rewarded for using the character/avatar for picking up trash placed throughout a virtual park. Depending upon the type of trash, it can either be recycled or composted at a virtual "Trash Recycler" located in the park. The Trash Recycler can include a virtual trash bag graphical user interface (GUI).

According to another aspect of the trash collection activity, the trash can be spawned randomly throughout the park. The system can choose how much trash to spawn, how often and where to spawn the trash based on a specific algorithm. The algorithm can determine the spawning randomly and/or based on odds assigned to different kinds of trash. The system can check the number of trash items remaining in the virtual park at a predetermined interval (e.g. every ten minutes). When the system performs this check, if the number of trash items falls below a predetermined value (e.g. 30% of maximum), the system automatically spawns new trash. The user can be provided "Green Points" for recycling and composting trash. Upon accumulating certain numbers of Green Points, the user gets various virtual items as prizes. The Green Points can also displayed on a Green Points "widget" on the user's social networking page. This trash collecting system encourages the user to visit the website and the virtual park often to get more Green Points.

Provided is a method of interacting with a common room in an internet system, comprising:
establishing from a client computer, a specific character for a user;
interacting over the internet in a common area with a plurality of characters, from the client computer, the interacting including the specific character;
selecting a portion of the common area for display; and
displaying a subset of local characters from among a total plurality of characters in the portion of the common area, the set of local characters being less than all of the total plurality of characters, and the subset being based on a criteria associated with the interacting.

Also provided are a plurality of embodiments the invention, including, but not limited to, a method for providing characters for efficient display in a common room of an online entertainment system including at least one server, said method comprising the steps of:
providing a common area for participation by a plurality of characters engaging in the online entertainment system, with the plurality of characters including a specific character of a particular user;
receiving input which enables selecting a portion of the common area for display to the particular user using the server;
determining a set of local characters from the plurality of characters that are stored in the server and are linked to users, wherein the local characters are characters that are present in the portion of the common area;
analyzing information in the server that is linked to the local characters or linked to a corresponding user of the local characters for matching a selected criteria linked to the specific character or linked to the particular user;
determining a subset of the local characters for display to the particular user as being present in the portion of the common area, wherein the subset is generated using the selected criteria to determine the subset from the set and where the subset includes fewer characters than the set; and
the server outputting data for displaying the subset of the local characters to the user computer associated with the particular user, wherein the data has the subset of the local characters for display on the user computer with fewer characters than the set of local characters, thereby resulting in displaying less than all of the characters present in the portion of the common area.

Further provided is a method for providing characters for efficient display in a common room of an online entertainment system including at least one server, said method comprising the steps of:
providing a common area for participation by a plurality of characters engaging in the online entertainment system, the plurality of characters including a specific character of a particular user;
receiving input which enables selecting a portion of the common area for display to the particular user using the server;
determining a set of local characters from the plurality of characters, that are stored in the server and are linked to users, wherein the local characters are characters that are present in the portion of the common area;
analyzing information in the server that is linked to the local characters or linked to a corresponding user of the local characters for matching a first selected criteria linked to the specific character or linked to the particular user;
analyzing information linked to each one of the local characters or linked to the corresponding user of the local characters for matching a second selected criteria linked to the specific character or linked to the particular user;
determining a subset of the local characters for display to the particular user as being present in the portion of the common area, wherein the subset is generated using both the first selected criteria and the second selected criteria to determine the subset; and
the server outputting data for displaying the subset of the local characters to the user computer associated with the particular user, wherein the subset of the local characters for display on the user computer has fewer characters than the set of local characters, thereby resulting in displaying less than all of the characters present in the portion of the common area.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
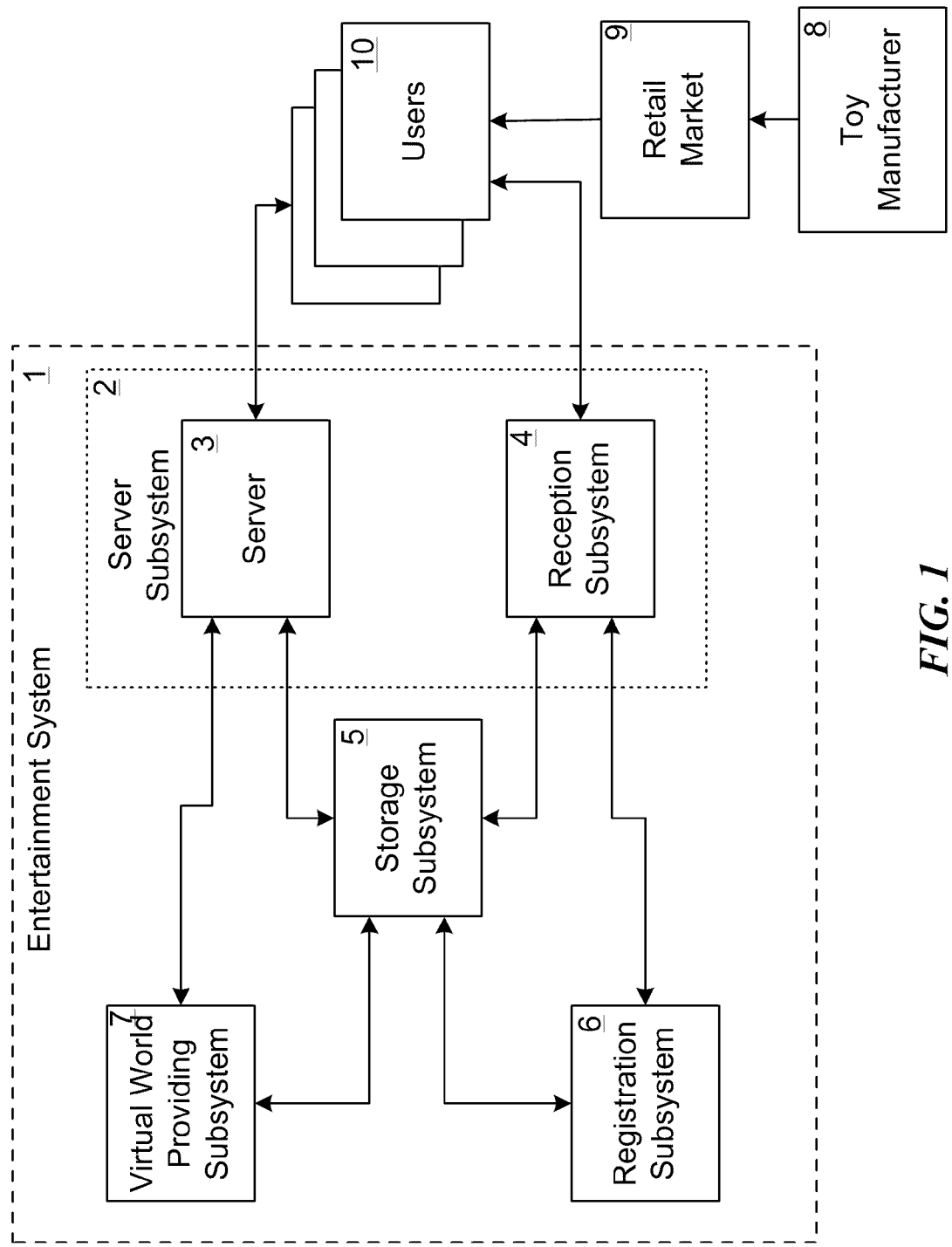
FIG. 1 shows a schematic block diagram of a current embodiment of the system and its interactions with some external entities.

Disclosed is a system providing a graphical chat room and/or a virtual world on a website in which users can control avatars or other characters to participate in activities and interact with other users' avatars/characters. More specifically, the invention relates to such a chat room or virtual world of the system providing a common location where a large number of users might participate, but where, because display of all of the participants becomes impractical or otherwise unwieldy, the system displays only a portion of the chat room or other common area, and displays on a limited number of characters/avatars that are present in the room.

In particular, provided is a method of improving the efficiency of an entertainment system, such as an online system (e.g., a web-based system), video game, or other system by optimizing the display to a particular user, using a specific character, of a large "virtual" common area having a large plurality of other user characters participating in the area. Typically, to be efficient, a system would merely display the closest characters to a given user's specific character, and let the user zoom in or out of a given area or scroll around, with the other users' characters merely arriving and leaving based on their location in the area being viewed. But this does not necessarily provide the user with a view of those characters that are most important to the particular user or most desirable for the particular user to interact with. Alternatively, the system could increase the number of characters shown to the user so that the user can see those characters that are most important or most desirable. But this tends to both overload the system, and makes the user's display confusing and unusable.

Accordingly, providing a method of improving both the efficiency of the system in providing data for display to a user by limiting the amount of data provided to the user (by limiting the number of characters viewed by the user), and also improving the displayed material to the user so that the user sees those characters that are most important and/or most desirable for user interaction, without the user having to search through a large number of characters to find the most important or most desirable ones.

I. Webkinz® Embodiment

This embodiment for improving display efficiency and understandability can be implemented, for example, on any suitable website including a common area, graphical chat room and/or a virtual world, such as the one described in U.S. Patent Application Publication No. 2008/0163055 A1 to Ganz, where users purchase a product, such as a stuffed animal, with a registration code, and by entering the registration code in a corresponding website, the user receives a virtual pet corresponding to the stuffed animal. The user can then participate in activities with the virtual pet, including participating in common areas such as chat rooms, or virtual parks.

Similarly, a more complex virtual world is disclosed in U.S. Provisional Application Ser. No. 61/327,364 that can utilize the features disclosed herein, where complex common areas such as parks, cities, towns, shopping areas, chat areas, etc. are disclosed for participation by users. Such a virtual world has many common areas where hundreds, or even thousands, of users might be present for participation in various activities.

In addition, various chatting systems, such as disclosed in U.S. Pat. No. 6,910,186, incorporated herein by reference, could be implemented which may have hundreds or thousands of participants all represented by avatars chatting in common areas, and thus could utilize the features discussed herein.

Characters and avatars can be provided in different types and classes. Examples of different types of characters include but are not limited to sports players, soldiers/fighters, firemen, students, animals, etc. Sports players and animals can be further divided into different types of animals and different types of sports players. Note that the terms character, virtual character, virtual item, or avatar may be used interchangeably in this document. Generally, an avatar is considered a virtual character which actually represents the user, whereas generally, a character, or virtual character, is a virtual item that is animated and controlled by the user, but doesn't necessarily (but could) represent the user, but also could be used represent another "thing", such as a product purchased by the user (e.g., a stuffed animal, figurine, etc.), a game character (such as a baseball player, for example), or something else.

FIGS. 1-4 show an example entertainment system where the character provided by the system is a virtual representation of a product purchased by a user, such as, for example, a stuffed animal.

FIG. 1 shows a top-level block diagram of the example Entertainment System 1, interacting with various users 10. The users 10 should have previously purchased and registered one or more toys from a Retail Merchant 9, who obtained the toys from a manufacturer 8, or via a distributor.

If the user has not yet purchased a toy, the user can still access the System 10 to obtain information about the System and/or the toys, but will not, in the current embodiment, have access to much of the site until a toy is purchased and registered.

The Entertainment System 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem.

The Entertainment System 1 also comprises a Storage Subsystem 5, for storing system data, user IDs and passwords, toy registration codes, personalized user information, etc. utilized by the various subsystems. The Storage Subsystem 5 of the current system will utilize a commercially available database application running on commercially available hardware, for example.

A Registration Subsystem 6 is used for registering the user and the user's toy into the system, so that the user has access to restricted portions of the system. The Registration Subsystem 6 may utilize its own dedicated application and hardware, or could be combined with or share the Server Subsystem 2 applications and/or hardware. The registration subsystem examines the registration code against stored data relating to a plurality of registration codes each representing a toy for sale.

A Virtual World Providing Subsystem 7 generates and/or provides the virtual world data to be served by the server 3 to the users 10 for use in displaying a virtual world on the users' computers. Portions of this data may be generated on the fly in response to user interactions, and portions are likely to be obtained and/or derived from data stored in the Storage Subsystem 5. (For example, in the current embodiment, items owned by the user (the items in the dock for example), the virtual room state [virtual furniture in the room for example], virtual cash, health, happiness, hunger parameters are all examples of "stored data", whereas data generated on the fly include position in the room [which also gets stored], and Arcade Game scores, all of which are described in more detail below).

Again, the Subsystem 7 may utilize unique applications and/or hardware, or may be combined with one or more of the Registration Subsystem 6 and/or the Server Subsystem 2 applications and hardware.

Figure 2:
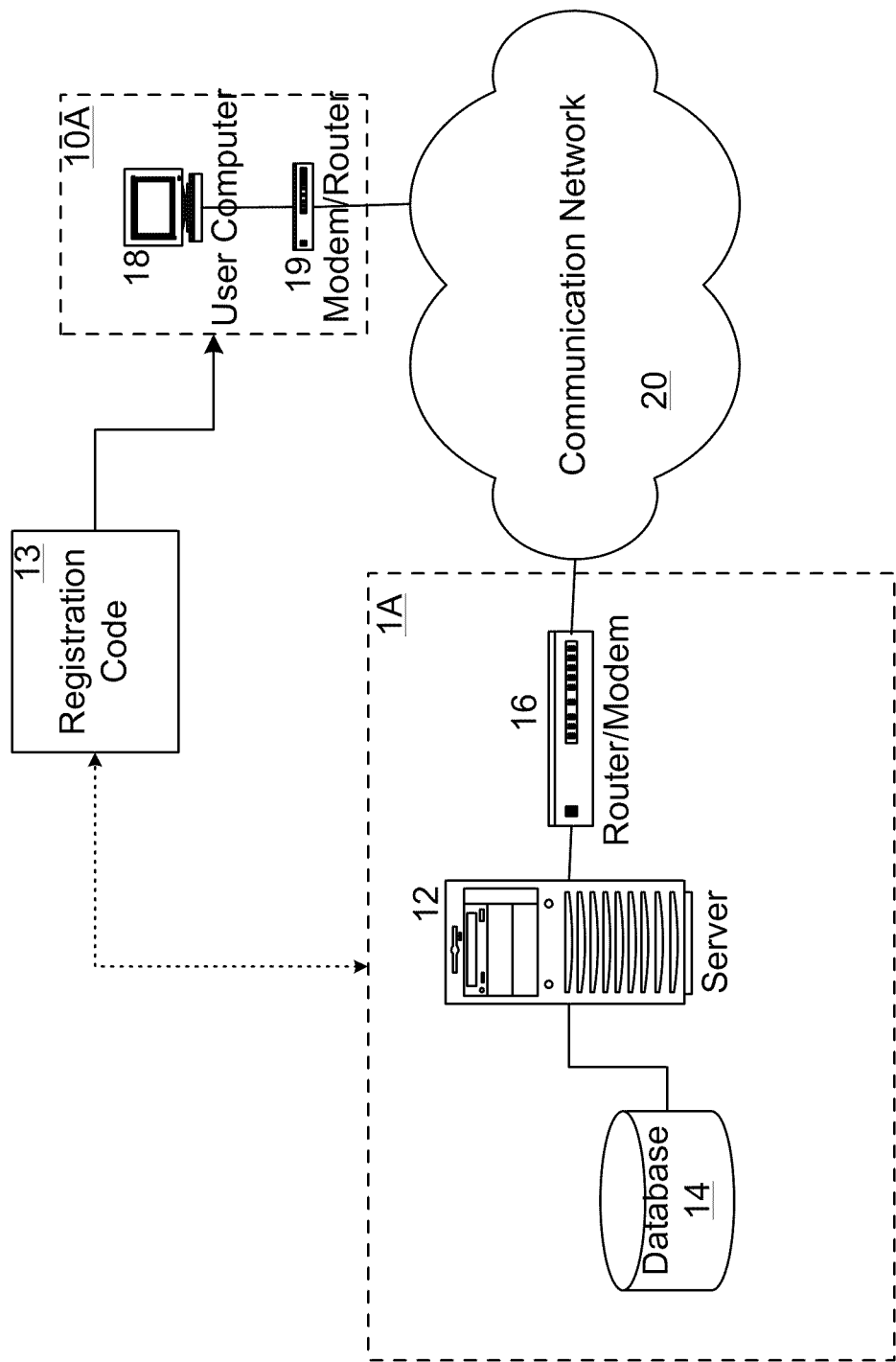
FIG. 2 shows a schematic diagram of a possible hardware implementation of an embodiment of the invention.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router and/or modem 19, for example. In this implementation, the server 12, along with the database 14 and router/modem 16 and the appropriate software, implement all of the subsystem functions of the System 1 shown in FIG. 1 by executing various application programs on the server 12 hardware, for example. Of course, the system 1A may also support many additional users in a manner similar to that shown for user 10A, for example.

This example embodiment can utilize the Internet as the public communications network. However, other communications networks could be utilized, such as telephone networks, cellular networks, dedicated networks, cable TV networks, power lines, etc. Furthermore, combinations of these networks can be used for various functions. However, because of the ubiquitous nature of the Internet, a solution utilizing that diverse network (which can utilize many individual communications networks) is utilized in the current embodiment.

Furthermore, the System 1 might also utilize a private communication network for at least part of the system. For example, the Registration Subsystem 6 of FIG. 1 might be connected to a private computer network located at the retail store 8, where the user might register the toy, for example, as discussed in more detail below. Alternatively, the toy might automatically be registered at the time of purchase (e.g., by scanning a code at the register, for example), and thus not require any user interaction at all beyond purchasing the toy. Or the user might send in a registration card to implement registration, as another example.

Figure 3:
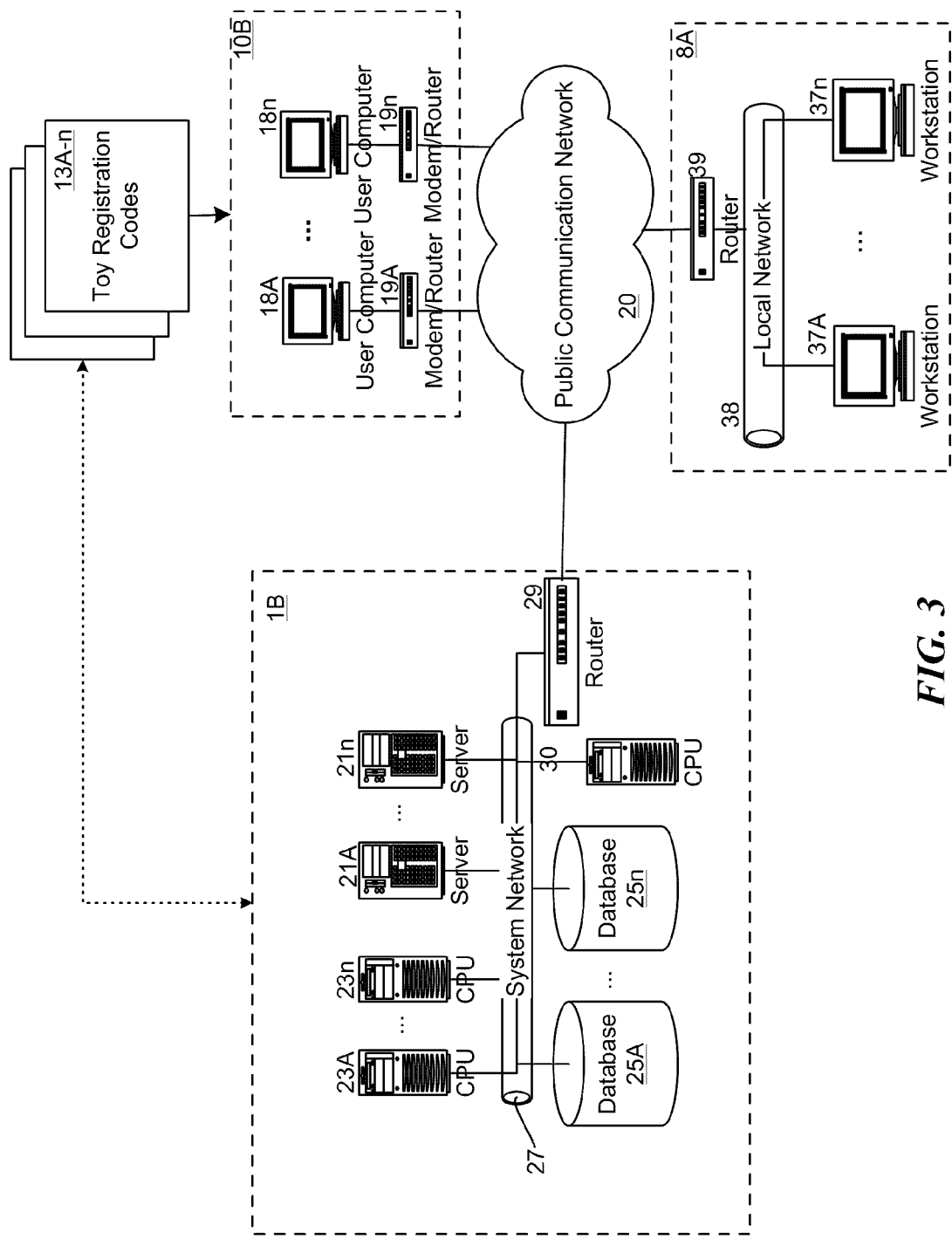
FIG. 3 shows a schematic diagram of a more complex hardware implementation of another embodiment of the invention.

FIG. 3 shows a more complex implementation 1B of the System 1. In this example system 1B, a plurality of servers 21A-21n can be utilized to implement the server subsystem 2 functions of FIG. 1. Furthermore, a plurality of CPUs 23A-23n can be utilized to implement the Virtual World Providing Subsystem 7 functions of FIG. 1. A plurality of database storage devices 25A-25n may be used to implement the Storage Subsystem 5 functions of FIG. 1. And a CPU 30 can be used to implement the Registration Subsystem 6 functions of FIG. 1, for example. Finally, a router 29 can be used to connect to the Public Communications Network 20

Note that, although FIG. 3 shows multiple servers 21A-n, multiple CPUs 23A-n, and multiple databases 25A-n, any of these might be implemented on one or more shared computers in various configurations, executing one or more computer program applications, as desired. As the number of users supported by the system 1C grows, additional hardware can be added to increase the capacity of the system, as necessary, in a manner similar to that shown in the Figure.

Continuing with FIG. 3 showing the more complex implementation 1B, a plurality of users can be supported in various configurations. For example, a plurality of users 10B operating single workstations 18A-18n, individually connected to the public communications network 35, can be supported. Furthermore, complex user networks can also be supported. Retailers and or Toy Manufacturers might also have access to the system, as represented by the example shown in 8A, should an online-ordering system be implemented for selling toys. Of course, alternate implementations are also possible, depending on the types and number of users and/or retailers being supported, and also depending on the state-of-the-art computer technology.

In this example embodiment, the System uses an Apache web server running in a Linux environment. For webserver hardware, an Intel multiple core CPU with RAM running Gentoo linux with the appropriate extensions (e.g., mod_php4 and mod_perl) can be utilized. The server will serve flash content to a web browser running a web browser application using PHP, Perl, and actionscript, and flash plugins, for example. A MySQL database application will also be utilized for the storage subsystem.

The client (user) side Flash application makes the calls to a number of PHP files. These PHP files then "interface" with the MySQL database to obtain the necessary data. All are served by the Apache web server, which can serve HTML, XML, along with the appropriate flash and other content. For multi-user environments (e.g., the multi user rooms discussed below) these are served by a socket server written in Perl.

This is effectively a 3 layer type of setup: Flash layer <--> PHP layer (this handles requests to the back end) <--> MySQL database, as shown in FIG. 1A. FIG. 1B shows the interaction between the client (user) and server subsystem data flows in more detail. A dedicated database server running MySQL on a dedicated computer running the Gentoo linux OS can be used in the current system.

A secure Apache SSL server can be utilized for the registration subsystem, likely sharing the computer with the other Apache server.

Figure 4:
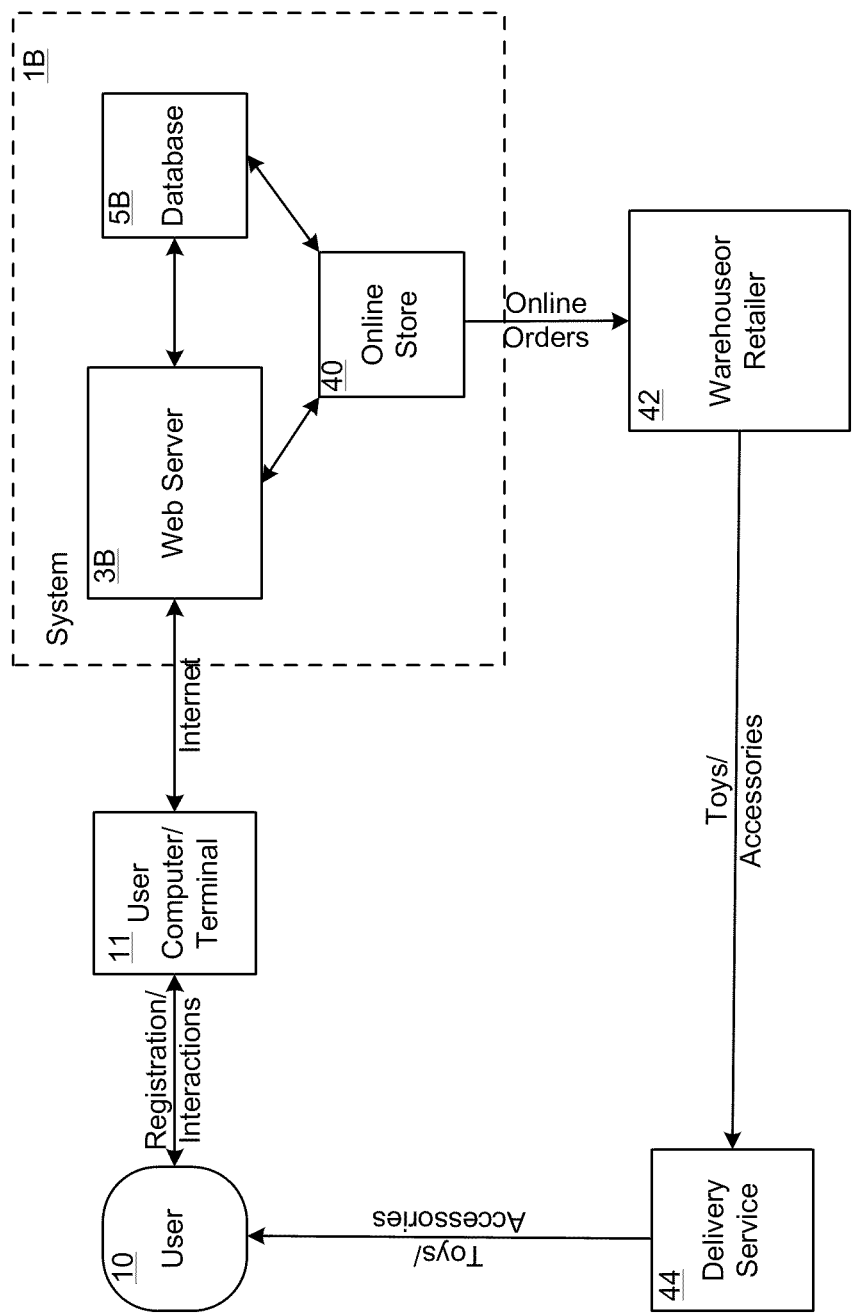
FIG. 4 shows a block diagram of an alternative embodiment of the system and its interactions with some external entities.

FIG. 4 shows an alternate embodiment of the Entertainment System where the toys are sold to user via an online merchant. In this alternate embodiment, the Entertainment System 1B includes an online store 40 for a user 10 to purchase toys. The user 10 purchases the toys using the user computer 11, making an online payment using a credit card or online payment service, for example. A Warehouse or Retailer 42 then delivers the purchased toys, via a delivery service 44, for example, to the user 10. Registration of the toys could be automated, or as described above and below for a store-purchased toy.

Figure 5:
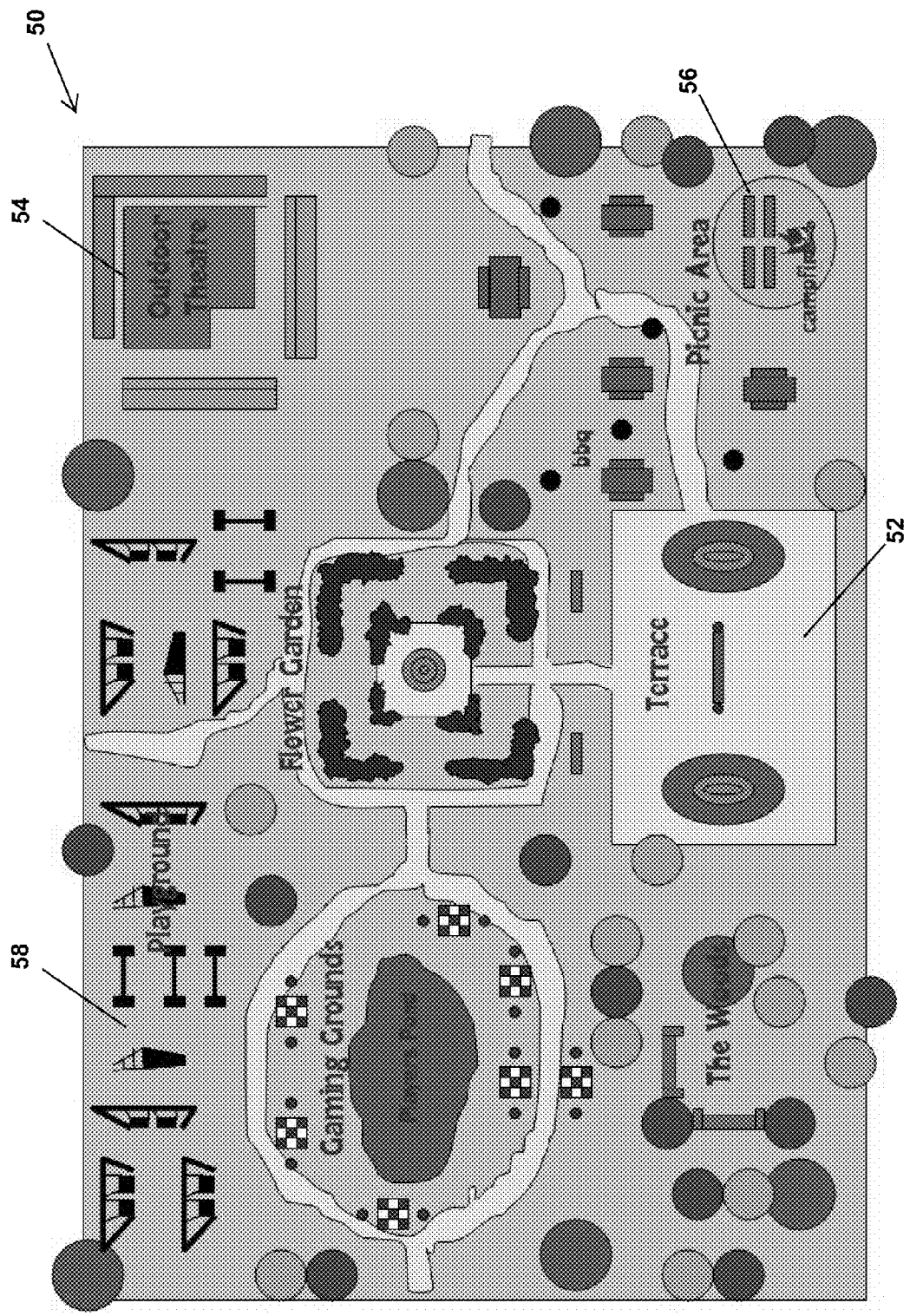
FIG. 5 shows a schematic diagram of an example common area.

An example implementation of this System is provided for the commercially provided Webkinz® website, where users animate virtual replicas of pets that are obtained by registering registration codes provided on a stuffed animal, and where the virtual pet resembles the stuffed animal (see U.S. Pat. No. 7,677,948, incorporated herein, for example). Such a site could be adapted to provide a common area, such as a park, for use by a large number of users for "visiting" by their virtual pets. Various chatting functions, games, and other activities could be provided in different areas of such a park FIG. 5 shows a first embodiment of such a park 50, having various locations such as gaming grounds, woods, an outdoor theater 54, a playground 58, a picnic area 56, and a terrace 52, for example, as shown in the FIG. 5. The introduction of animated slides, swings and teeter totters having multiple animation states (described in more detail below) that allow for pet interaction can be provided within the park. All of these screens are formed by electronic information that is formed in the server computer and transmitted via electronic representation, over the internet, to the client computer. In the embodiment Gaming Grounds can be provided where users are able to play various games against other Webkinz owners. Games such as checkers, go fish, Link'd, Zingoz Swithcherooz and Skunk Sweeper.

However, such a common area is typically too large to show in its entirety on the computer display of the user visiting the area with his pet. Thus, the System is adapted to show only a portion of the park, and thus will show a reasonable portion surrounding the user's pet. The size of this portion is chosen so that the nearby features are reasonably shown on the user's display, but so that not too much detail is provided to confuse the user or overly "clutter" his display. The system can provide the user with the illusion that the user's virtual pet is actually strolling through the park.

Figure 6:
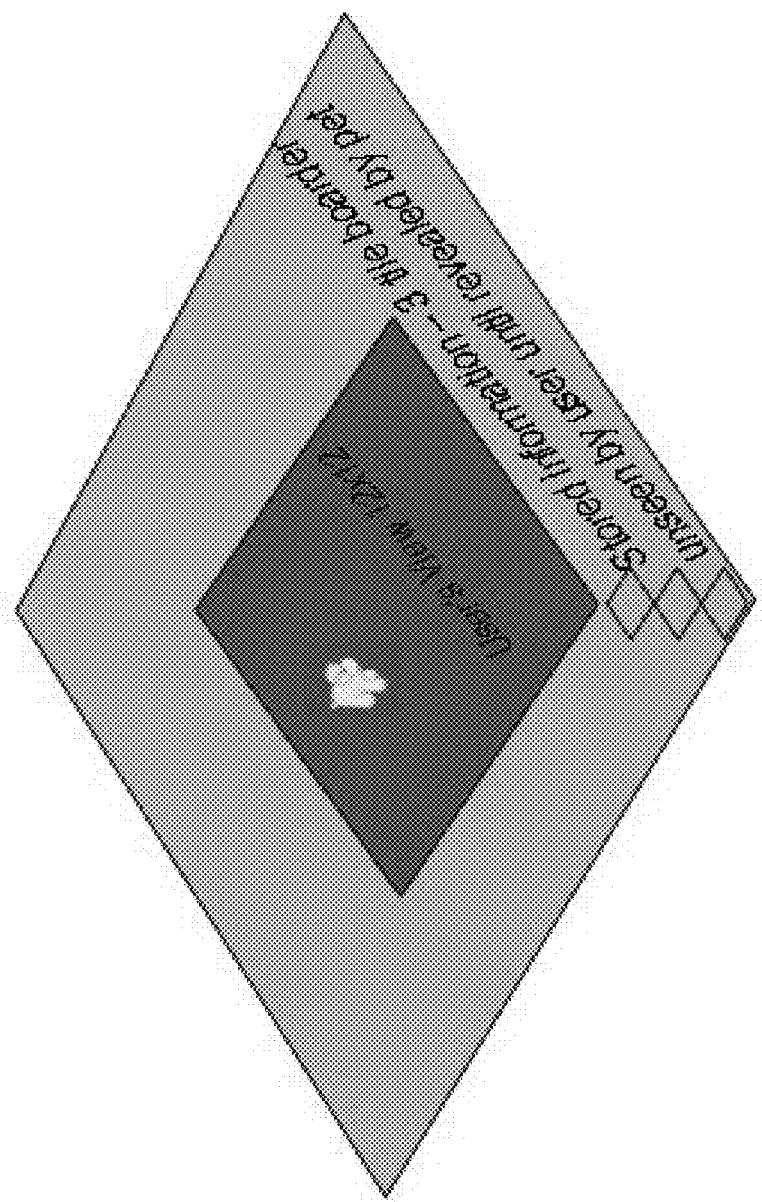
FIG. 6 shows a schematic diagram of a portion of the common area around a character that is displayed and that is stored in memory.
Figure 7A:
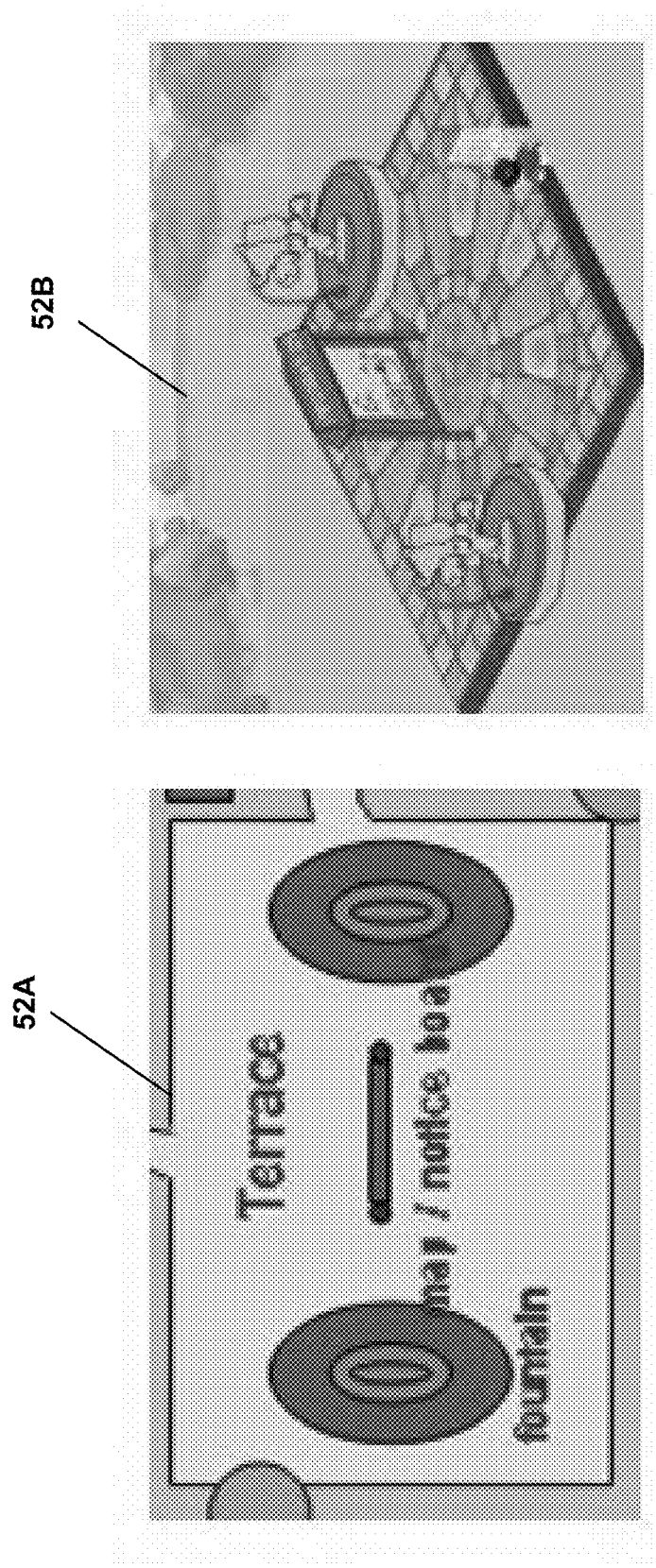
FIG. 7A shows a schematic diagram of a portion of the example common area and a corresponding graphical representation of that portion.
Figure 7B:
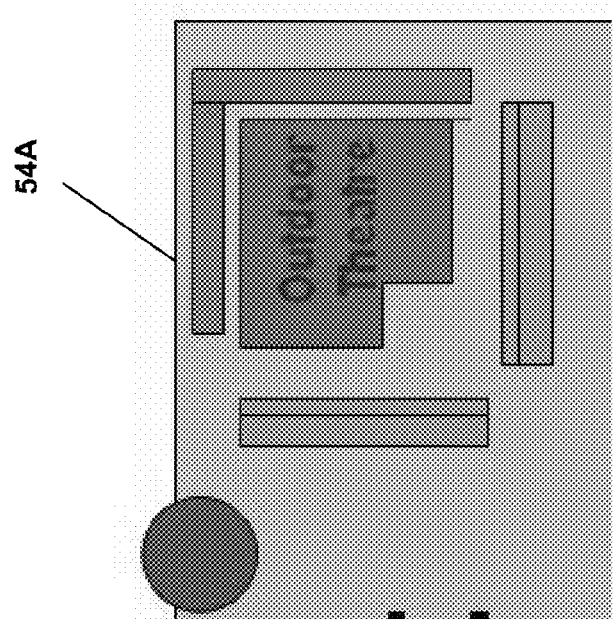
FIG. 7B shows a schematic diagram of another portion of the example common area and a corresponding graphical representation of that other portion.
Figure 7B:
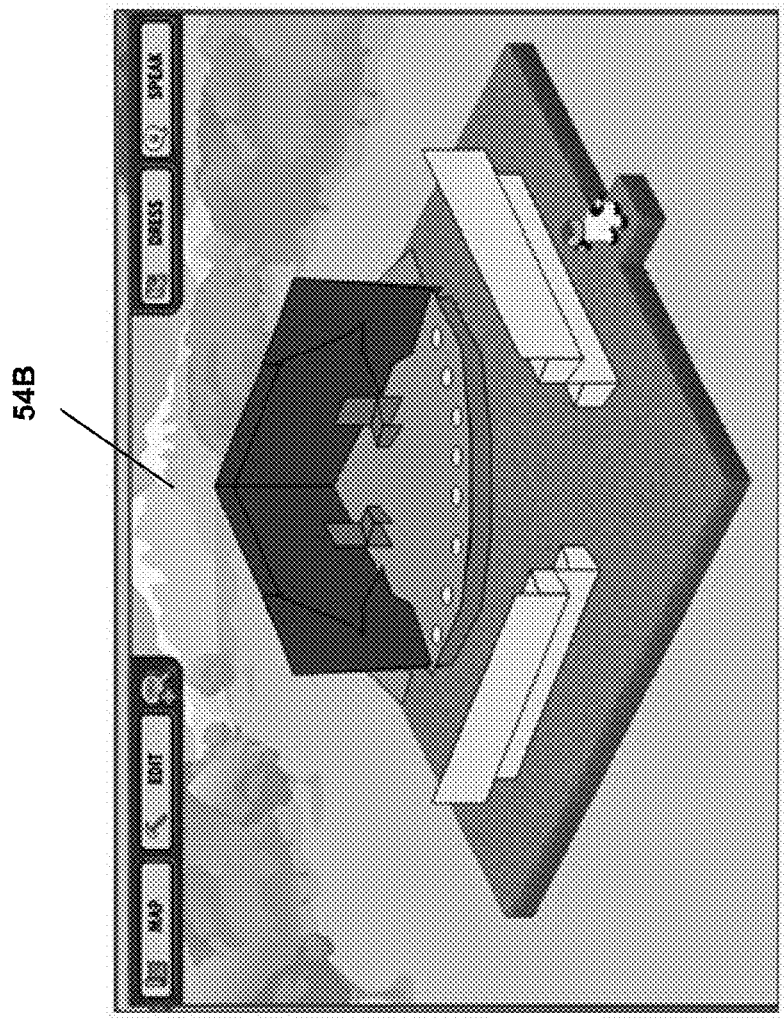

Due to the large size of the park (e.g., 60×40 tiles) it will not be shown all at once in its entirety. However, the view will slide around with the pet's movement. A user is able to view, for example, a limited 12×12 tile area at any point; however, the system can have a larger area, such as a 15×15 tile area, loaded into memory and discarded from memory as the items move out of range. FIG. 6 provides a simplified diagram showing the pet in a portion of the park, where only part of the park is shown and a remainder is provided in memory. The area shown in FIG. 6 is still only a portion of the entire park. The area displayed to the user is changed as the pet traverses the park or the user scrolls through the park using mouse/keyboard functions. FIG. 7A provides an example of showing only a part of the park, where the Park Terrace 52 is shown, schematically on the left (52A) and graphically on the right (52B). Similarly, FIG. 7B shows such an example for the Outdoor Theater schematically on the left (54A) and graphically on the right (54B).

The Park Terrace may have fountains, for example, where pets may be able to splash and swim. The Outdoor Theater may have a set of bleachers, where users clicking on an empty location/spot on the bleachers will cause their pet to occupy that specific location. If a user clicks a spot on the bleachers occupied by another pet, no action occurs. If a user's pet is sitting on the bleachers, clicking anywhere on the ground will cause the pet to walk to the tile that was clicked by the user.

Figure 8A:
FIG. 8A is an example screen shot of a "Things to Do" menu within a "Fun and Games" category providing a link to the example common area.
Figure 8B:
FIG. 8B is an example screen shot of a selecting interface for providing a user with a choice of a plurality of common areas.
Figure 9:
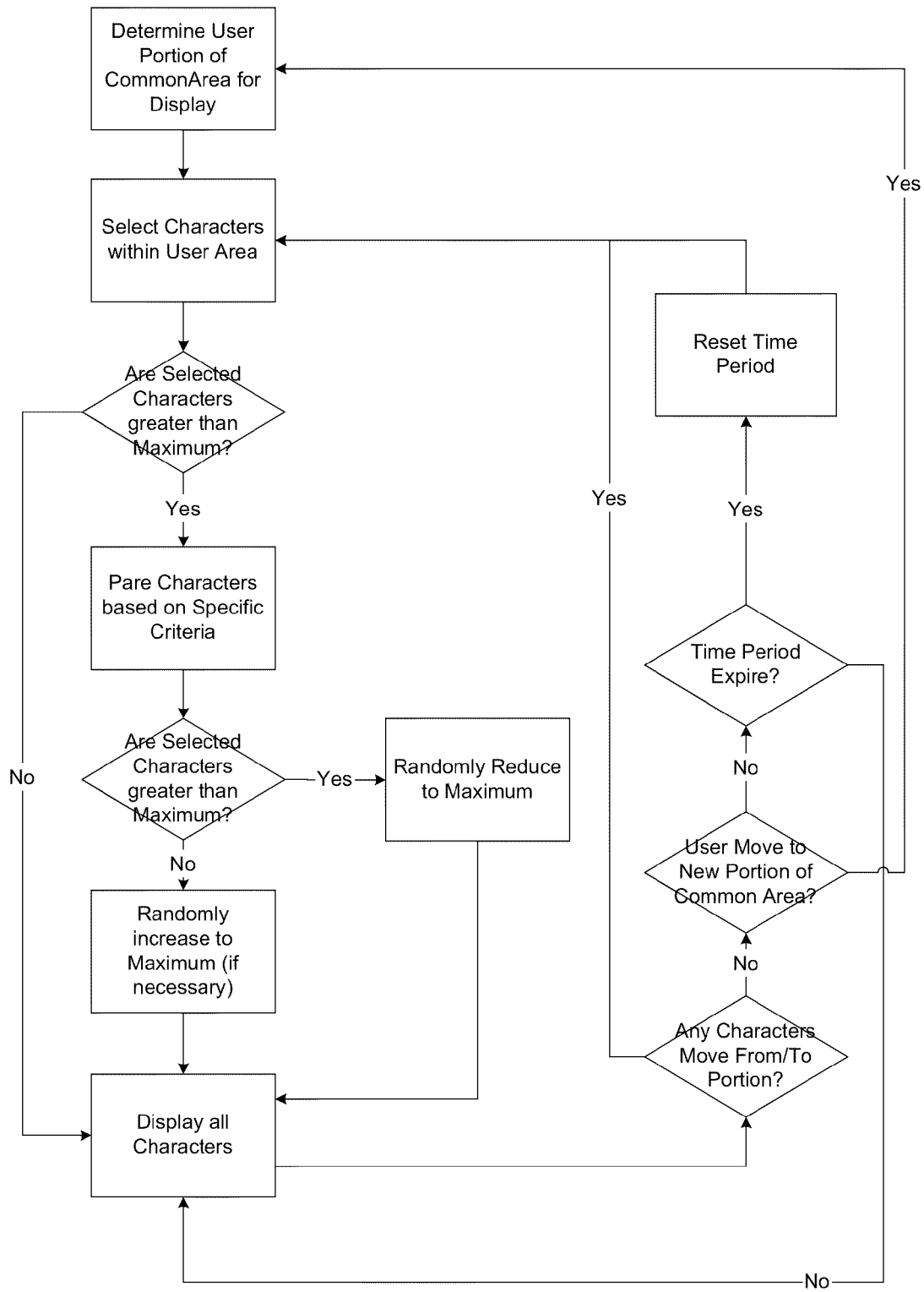
FIG. 9 is a flow chart of an example method of selecting a subset of characters in a portion of the example common area for display.

Users are able to access the park (e.g. "Kinzville Park") by going to a menu on the website and choosing an appropriate link. FIG. 8A shows a screenshot of a "Things to Do" menu within a "Fun and Games" category providing such a link. Once the Kinzville Park link has been selected, the user will choose either "KinzChat" or "KinzChat Plus" (providing two different chat features) and, if more than one park is provided, the users are redirected to a park selecting interface where the user will choose an available park (one with fewer than 100 users present, for example). The number of users currently in any given park, and the number that the park can hold, can be shown on the selecting interface, as is shown by the screenshot of FIG. 9. A park that has more than the maximum number of users allowed (e.g., 100, 200, etc.), can be designated as being "full" and eliminated from being selectable by the user.

A certain number of empty tiles within the chosen park are designated as "spawning spots." These "spawning spots" will be scattered throughout the park in order to limit the number of pets spawning in one specific area of the park, and thus more evenly distribute virtual pets entering the park to avoid overcrowding particular areas. When the user's pet enters the park, the System chooses one of the spawning spots for the location the pet enters the park. The spawning spot may be chosen as the area with the fewest other pets, randomly, or as a location where the user has some relationship, such as a location where pets of friends on the user's "friends list" (see below) are located, for example. The Park Terrace shown in FIG. 7A could be one such spawning spot, for example, with the Outdoor Theater of FIG. 7B being another, among others.

As discussed above, due to the large number of pets (characters) that might be present in the area around the user's pet, it may be that not all of the pets can be efficiently displayed at the same time, as this would tend to overload the system, and overwhelm the user. Accordingly, if the number of nearby pets is larger than some maximum number, the method is applied by executing a software algorithm on the system computer so that a subset of important pets is determined, and thus only the subset of those pets is displayed. A method of determining which pets are important to display is provided below, so that the pets that are most desirable to the user and that the user would likely prefer to see are given a priority for being displayed.

Of course, each given user can have a different subset of virtual pets being displayed on its display (based on the data sent from the system to the users corresponding client computer), but it is preferable that users that are likely to want to see each other both have each other's pets displayed on their display (in particular, where the users are chatting). Accordingly, the algorithm determining which pets are displayed to which user should take such desirable results into account.

For Webkinz, users are permitted to choose certain other users as "friends" for inclusion on their "friends list". Such users are permitted certain functions that are prohibited to users not on a given friends list (for example, users on each other's friends lists can visit each others pet rooms). Thus the system of the Webkinz example has at least one indication that the system can use to prioritize which virtual pets are displayed to a given user, and it is likely that such users would want to see each other's pets. Accordingly, when pets within the user's viewing area are members of the user's friends list, those pets could be given priority for being displayed to the user.

The determination of which pets to display can be performed according to the following algorithm that is implemented in software running on the server, for example:

If the system determines that there are, for example, 30 or more pets within the user's view (the maximum chosen depends on the application—in this case the maximum displayed is 30, the user's pet and 29 others), the system picks, for example, 29 other pets to display and "hides" the remaining pets;

The 29 other pets selected should be first picked from a user's friends list, if members of their friend's list are currently visiting the park. Then, if there is any room left, the system may randomly select pets to fill the 29 total slots.

If the "viewing group" is full, the system will only track these 29 pets for a certain period of time, for example, 2 minutes (which may be a variable that changes based on conditions, locations, system capacity, etc.). All movement and speech from any other pets in the viewing area not displayed, and pets outside the viewing area, will be ignored.

After the 2 minute period is up, the system will determine if any of the 29 pets are outside the field of view. If so, they will be removed from the viewing group.

The system will then determine if any other friends are within the viewing area. If so, they will simply "appear" to the user (by the system adding them to the viewable list) and thus be added to the viewable group. Otherwise the system will pick X random pets in the view and display them (where X is the number of pets that will take the viewed other pets to the maximum 29).

If there are fewer than 29 other pets in the viewing group, the system can add and remove pets in real time as they enter and leave the viewing area.

Other criteria might also be utilized to determine which of the pets in a given location on display to the user are to be displayed. For example, geographic location of the users (determined by user profiles or the IP address of the user computer), the types of pets (like pets may be given priority, or pets that are different), the ages of the user, pets that are being used for users to chat with each other, or other information that can be ascertained about the user, such as from the user's user profile.

If more than one parameter is to be used to determine which pets are displayed, these parameters should be prioritized, such that a first parameter is used to find pets, but if the maximum is not used, a second parameter is used to fill remaining slots, and if there are still more slots available, a third parameter can be used, etc. According to an embodiment described herein for the operation of "Tail Towns", a more complex implementation of the selection algorithm is described.

Alternatively, if more than the maximum number of pets will qualify for the highest priority parameter, then additional parameters can be utilized to reduce the number to get to, or below, the maximum. For example, if more than 29 pets in the vicinity are on the user's friends list, those that the user visits with most often might be chosen, for example, or those of similar ages, geographical locations, or some other parameter.

In this way, only a subset of the park's total area or features or other parts are displayed to the user. Similarly, only a subset of the total number of virtual pets will be viewable in that subset of the park. If the total number of pets in that area are more than the maximum to be displayed, fewer pets are displayed using the techniques described above. This way, the system can more efficiently manage the material to be displayed, and the user is not overwhelmed by the material being displayed, or by too many virtual pets being displayed. The use of the virtual world thereby becomes more productive, efficient, and useful.

Various elements in the park can be provided having different animating states, based on certain variables, such as the presence of virtual pets, the length of time they are present, time of day, etc.

For example, the picnic area within the Kinzville Park is fairly large. Many different items can be provided in the park. The park can provide system owned barbecues, picnic tables, a campfire and log benches which surround a campfire. The campfire can be provided with three states:

Full fire—flames and sparks (animated)
Glowing ashes—(animated)
unlit logs within fire pit (static)

System owned barbecues can be provided to allow users to cook food within the Kinzville Park. Cooked food will appear within the user's dock (i.e., a control interface). The user is able to feed their pet by dragging and dropping a food item from their dock onto a pet's portrait while located anywhere within the Kinzville park.

Each hour, the system can randomly assign one of three states to the campfire. Therefore it will be possible that the campfire remains in the same state for consecutive hours.

The system can also provide various animated items for the user to interact with via the user's virtual pet, such as, for example:

Multi-state furniture items (e.g.: a surf board)
Furniture items that animate the pet along a set pathway (e.g.: a slide)
Multi-tile furniture items which can animate individually (e.g.: swing set)
Multi-tile furniture items which require multiple pets to activate animation (e.g.: teeter-totter)
Multi-tile items with multi-tile animations where the code in the item can take precedence to the code in the room engine (e.g.: swimming pool with diving board and slide);
Trees can be placed in various locations throughout Kinzville Park. Users can control their pets to "climb" certain trees within the park. If a user clicks on the leafy area of a "climbable" tree, the pet will occupy one of two spaces within the tree. Once a pet is perched within a tree, a user is able to click a tile anywhere on the ground surrounding the tree, causing the pet to dismount and walk to the selected tile.

Figure 10A:
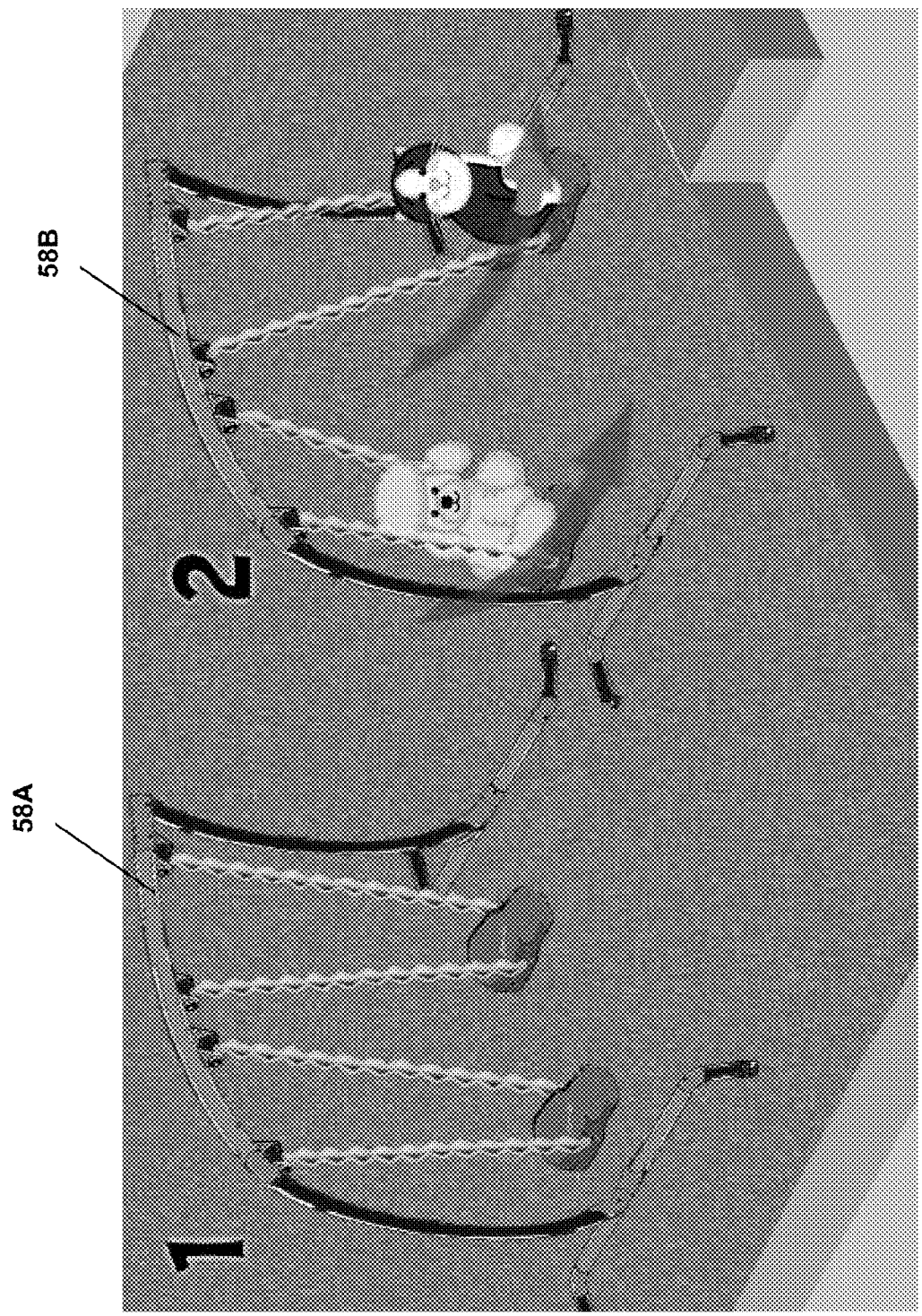
FIGS. 10A-10C provide example graphical representations of a number of activities that can be provided in the example common area.

An example of multi-tile items with multi-tile animations is shown in FIG. 10A for a swing set. The swing set OFF state 58A would actually be made up of several independent "Small Web Format" or .SWF files (with independent left and right sides). When a member (or other user) clicks the swing seat on the left, the pet is put into a sitting pose, switches the left side .SWF to its ON state 58B, and slides the pet's position in a looped animation sequence which is synchronized with the item's motion. The right side of the swing item remains in the OFF state until another pet is added to it.

Figure 10B:
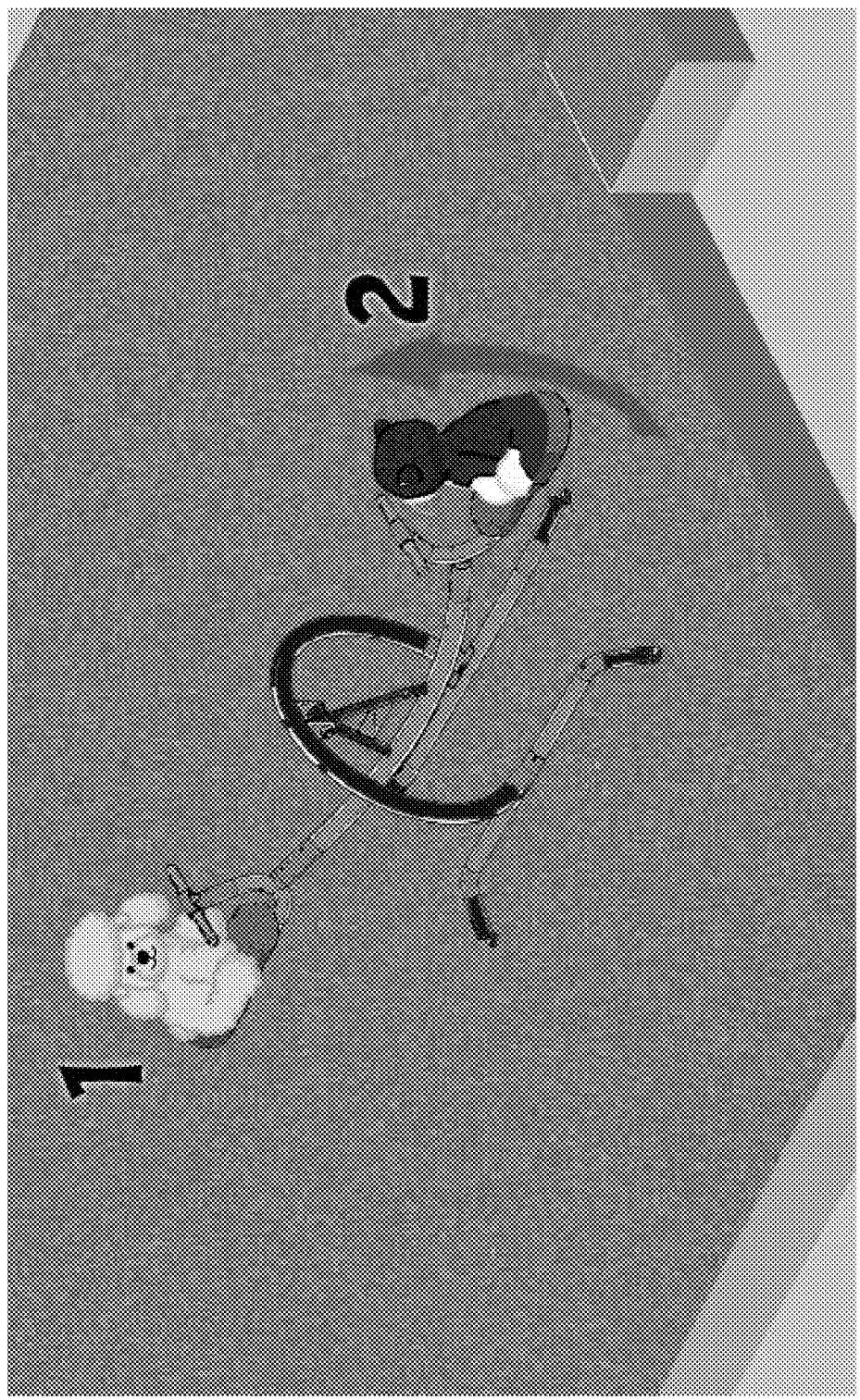

FIG. 10B shows a teeter-totter (see-saw), which is a multi-tile furniture items which require multiple pets to activate animation. The teeter-totter has 2 seat targets (each seat target positions the pet in a different view). Clicking on either target with a single pet will position the pet on the appropriate seat, but will not trigger the item's ON state. Only once a second pet is added to the other target (other seat) will the item switch to ON and start sliding both pets up and down in a continuous loop of animation. Once in the ON state, if either pet is removed from the item, it will switch back to OFF with the other pet remaining.

Figure 10C:
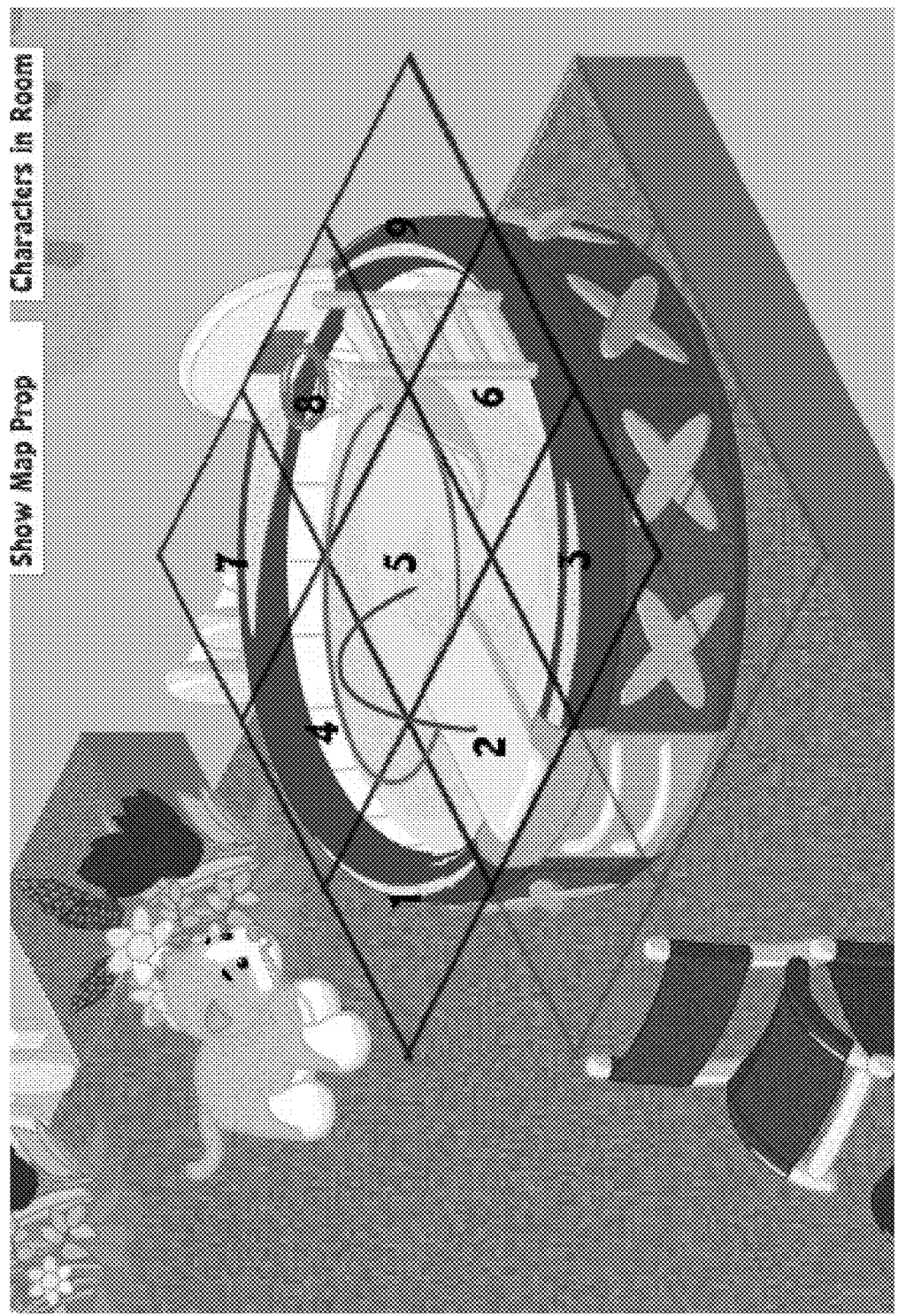

FIG. 10C shows a multi-tile item with multi-tile animation triggers found in a swimming pool. Clicking on most of the tiles will trigger the pet "swim" state (set on API scripts) and path as normal, but the diving board and slide tiles would contain unique Pet State code. If a specific tile has code in it dictating something which is already set in the room engine (e.g.: the Pet State), the code in that tile of the item should take precedence. In the swimming pool example, the Pet State on API scripts would be normally set to "swim" which would affect the majority of the tiles. However, a tile with a diving board would trigger the pet's "Jump" state (like on the trampoline), moving the path of the jump to one of the swim tiles.

A tile with a slide would work like the other slide example, moving the pet from one position to another (in "Sit" state) before releasing them on one of the swim tiles. In both cases, once the pet is sent to a swim tile, they would automatically trigger the pet's "Swim" state again. Clicking any tiles outside of the multi-tile item removes the pet from the object.

Figure 11A:
FIGS. 11A-11B provide example graphical representations for vending virtual ice cream in the example common area.

Another feature that can be provided at the park is an ice cream vendor (Mr. Moo). FIG. 11A shows an ice-cream salesman, Mr. Moo, approaching a virtual pet in a portion of the park. Mr. Moo will randomly appear within the Kinzville Park and sell ice cream cones from his Ice Cream Counter. Each user is only able to buy one ice cream cone each time Mr. Moo appears. Mr. Moo will appear in random locations within the park, causing users to search for him each time they visit. A number of ice-cream flavors can be provided, with variation on how often they are available (rarity). Flavors could come with specific types of cones (sugar cones, waffle cones and regular cones).

Each time a user buys an ice cream cone from Mr. Moo, that ice cream cone (or whatever other thing is purchased) will appear in the user's dock. Multiple instances of Mr. Moo are likely needed to prevent "hoarding" (all pets grouping in the same area of the Kinzville Park). Each instance of Mr. Moo will only be available to a percentage of visitors to the Park. There can be a number of limitations on the appearance of Mr. Moo, such as, for example:

Each time Mr. Moo appears within the park, he will only be selling ice cream for one hour until he disappears, or only sell a specific number of cones;
Mr. Moo can only appear within the park a maximum of two times in one day;
Mr. Moo will not appear within the park everyday;
Each user is only able to buy one ice cream cone from Mr. Moo each time he appears within the Kinzville Park.

Figure 11B:
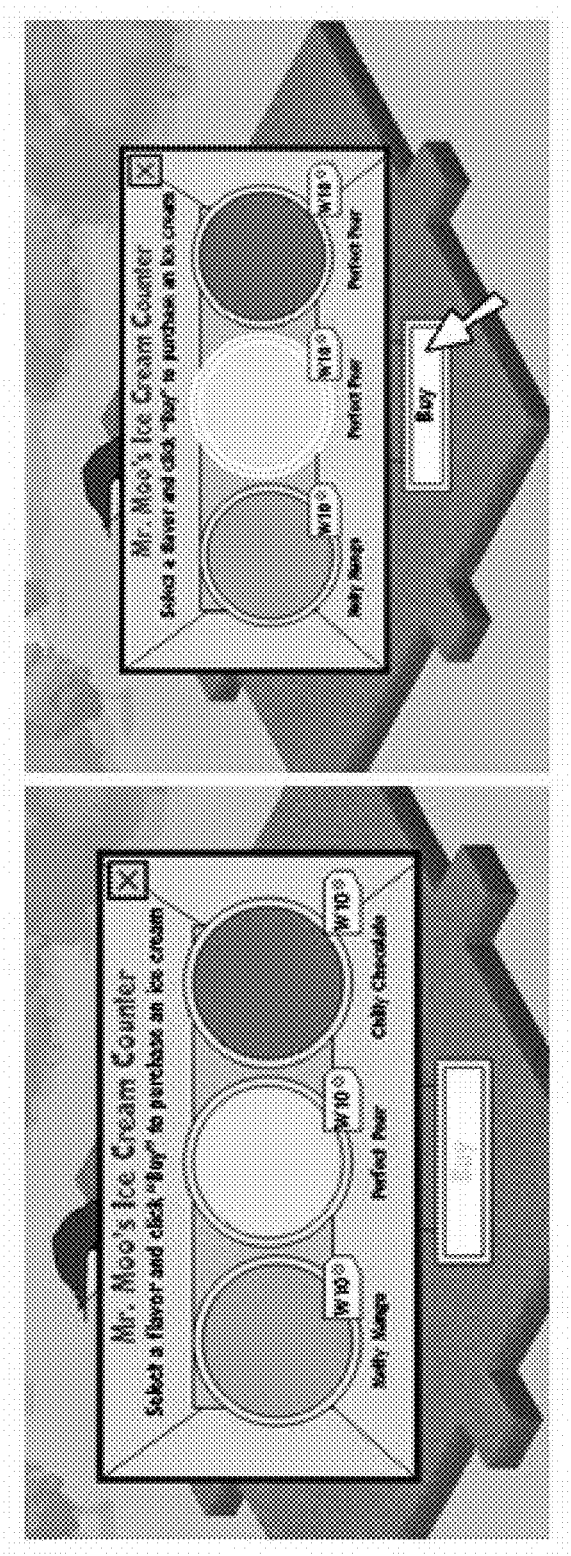

A pop up window featuring the interior of Mr. Moo's Ice Cream Counter will be created, as shown in FIG. 11B. Only a limited number of flavors, for the example three ice cream flavors, will appear within the interior at any given time, although it will be designed to allow rotation of flavors. Mr. Moo's dialogue will appear in standard chat balloons, therefore a voice over will not need to be recorded for this character. Virtual money can be required to purchase the ice cream. If a user clicks on Mr. Moo after having already purchased an ice cream cone, a standard chat balloon will appear next to Mr. Moo containing one of any number, such as three, messages informing the user that they are only able to purchase one ice cream cone at this time. Each user may be limited to one cone per hour, per day, or some other period, for example.

The system can also provide a number of balls for virtual pets to pick up and play with or otherwise keep. Each day the system will randomly "place" a certain number, X, of balls on X number of empty tiles throughout the park. Users are able to have their pets approach and "pick up" a ball by clicking on the ball if they enter that area of the park. A special "ball icon" will appear above a pet that is "holding a ball". Users will be able to have their pet "throw" balls to other pets within the park.

If a user clicks on another pet within the Kinzville park while their pet is "holding a ball", the system will create a path for the ball to travel (which may be unique and randomly chosen) and trigger a throwing animation featuring the user's pet throwing the ball to the selected pet, finishing with the selected pet "catching" the ball. If there is at least 1 empty space surrounding the pet making the catch, there is a certain chance, e.g., a 10% chance, that the pet will "drop" the ball. The animation will then show the ball being dropped. If the system determines that the receiver is to "drop" the ball (e.g., 10% chance following each throw if there is at least one "empty" tile surrounding "receiver) the ball will land in a random "empty" tile surrounding the "receiver" (ball will "land" on ground with slight "roll" effect). If a receiver moves his position to another tile in mid throw, a ball will land on tile that used to occupied by the "receiver" (ball will "land" on ground with slight "roll" effect).

Trash collection activities can also be provided at the park to encourage such activities by users (especially children) in real-life, and to encourage users to traverse the park and keep coming back.

Figure 12:
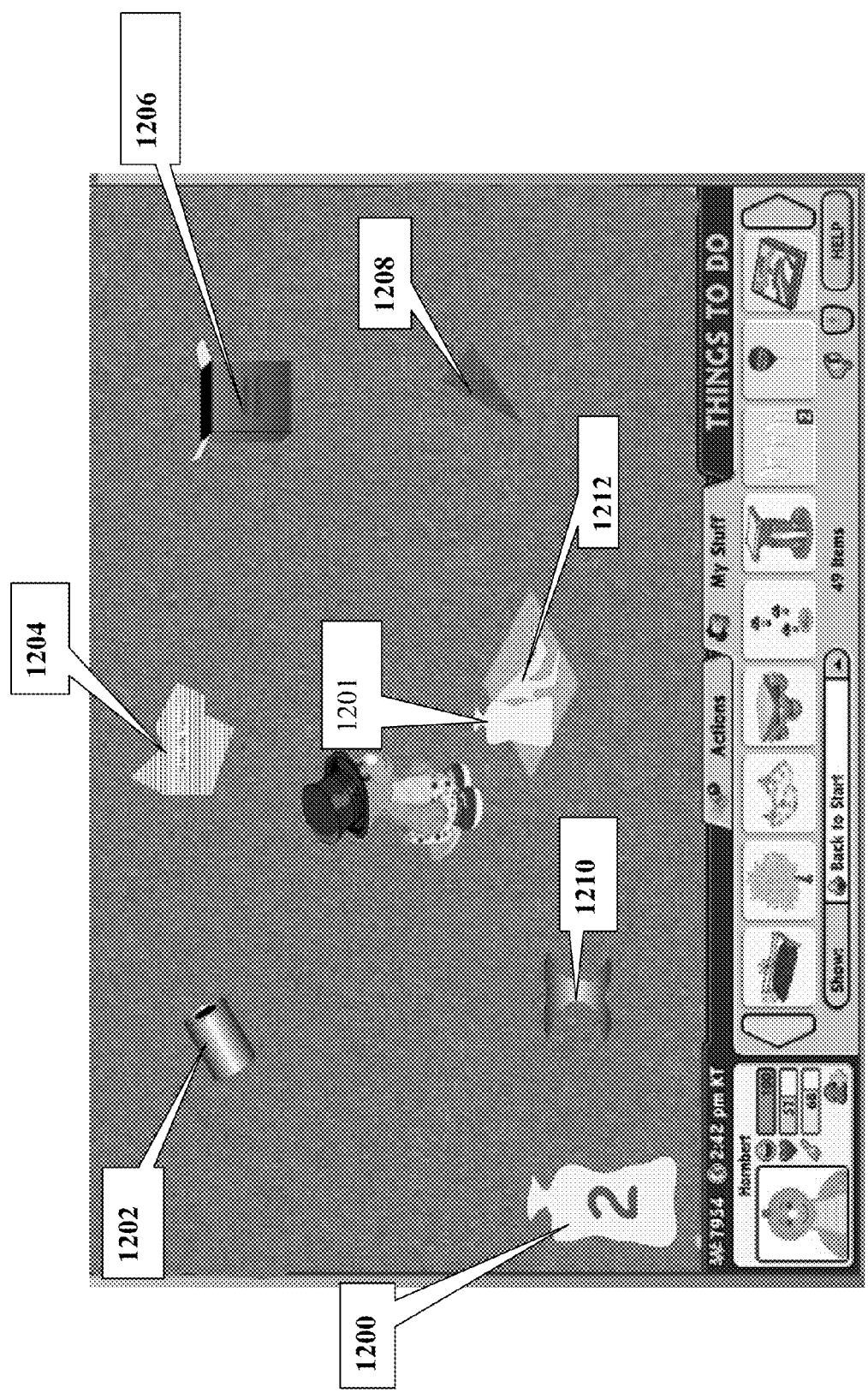
FIG. 12 is a graphic representation of a portion of the common area with trash items displayed.

While the user is visiting the park, the user can participate in a virtual trash collection activity (game) in which users are rewarded for picking up trash placed throughout a virtual park. Depending upon the type of trash, it can either be recycled or composted at a virtual "Trash Recycler" located in the park. The Trash Recycler can include a virtual trash bag graphical user interface (GUI) for tracking the amount of trash being collected. FIG. 12 shows graphical examples of such trash sown in a portion of the park with a trash-bag GUI element 1200. Each time a user picks up a piece of trash (by placing trash cursor 1201 over the trash piece using his mouse), the number on the trash bag 1200 increases by 1. This displays the number of held pieces of trash (in this case, 2). This GUI element is not displayed, for example, when the user is not currently holding any trash.

FIG. 12 shows various trash icons, such as a pop can 1202; crumpled paper 1204; an empty box 1206, an empty ice-cream cone 1208; an apple core 1210; and a banana peel 1212. Trash can appear in the park as one aspect of the park.

Figure 13A:
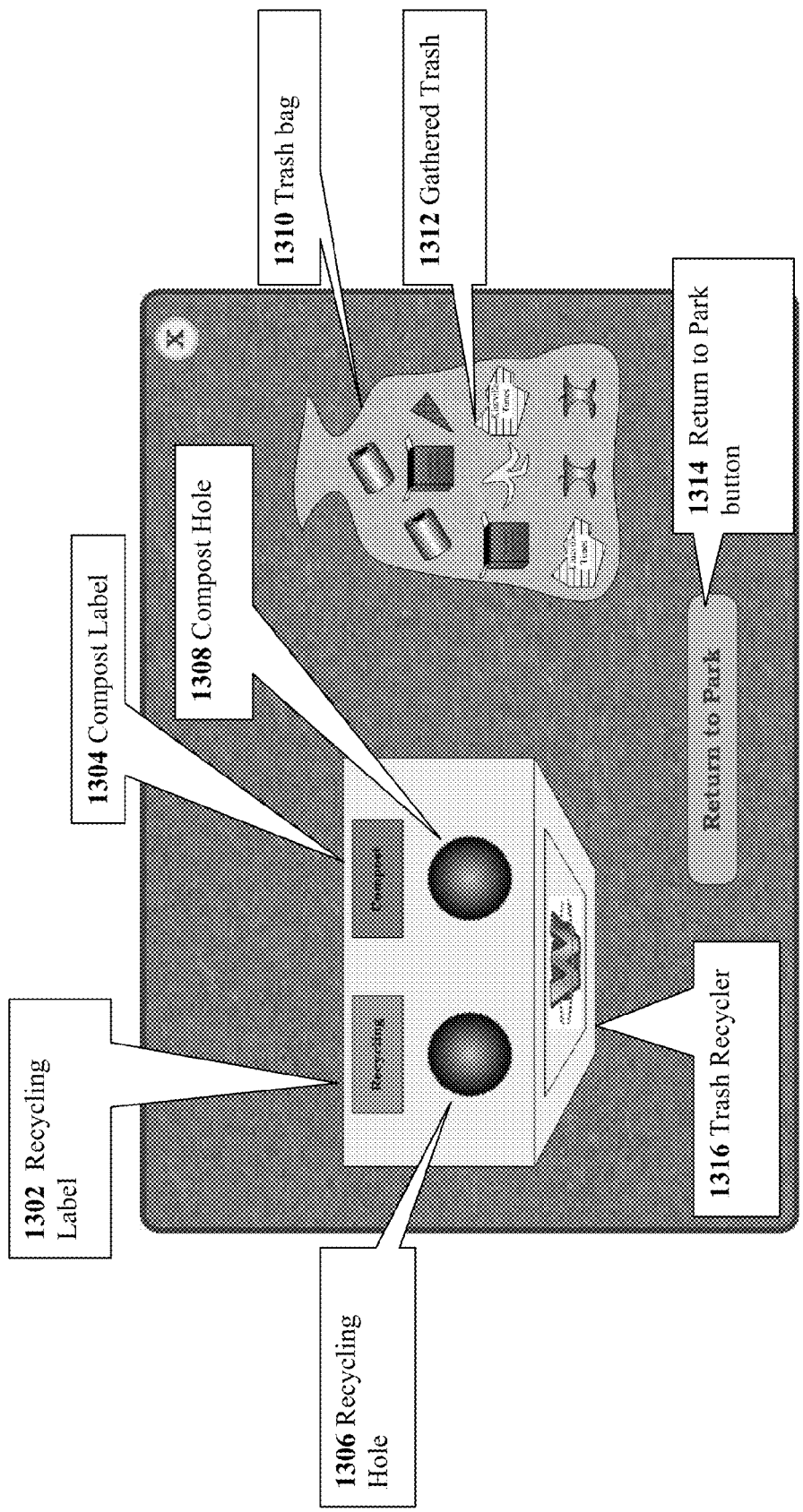
FIG. 13A-13B are graphical representations supporting a trash collecting activity in said example common area.

The trash should be deposited in a trash receptacle/recycler 1316, as shown in FIG. 13A which shows a trash recycler window having a Recycling Label 1302 and a Compost Label 1304; a Recycling Hole 1306 for users to drag their trash and a compost hole 1308 for users to drag their compost; a trash bag 1310 for the user to store the trash he has picked up which is shown in the bag as gathered trash 1312, a maximum number of which (e.g., 10) may be stored at a time; and a Return to Park button 1314 which allows users to close this window and return to the standard view of the Park.

Users drag their pieces of recycling trash or compost trash into the appropriate hole in the Trash Recycler window. Recycling trash (paper, cans, boxes, etc.) must be dropped into the recycling hole, while compost trash (apple cores, banana peels, etc.) must be dropped in the compost hole, for users to earn Green Points. The user may lose Green Points as a penalty by dropping the trash into the wrong hole, or dropping trash outside of a hole. If users dispose of some trash, but keep others, then when they pick up trash, the trash they pick up fills the spot and takes the variable of the lowest missing trash spot.

Figure 13B:
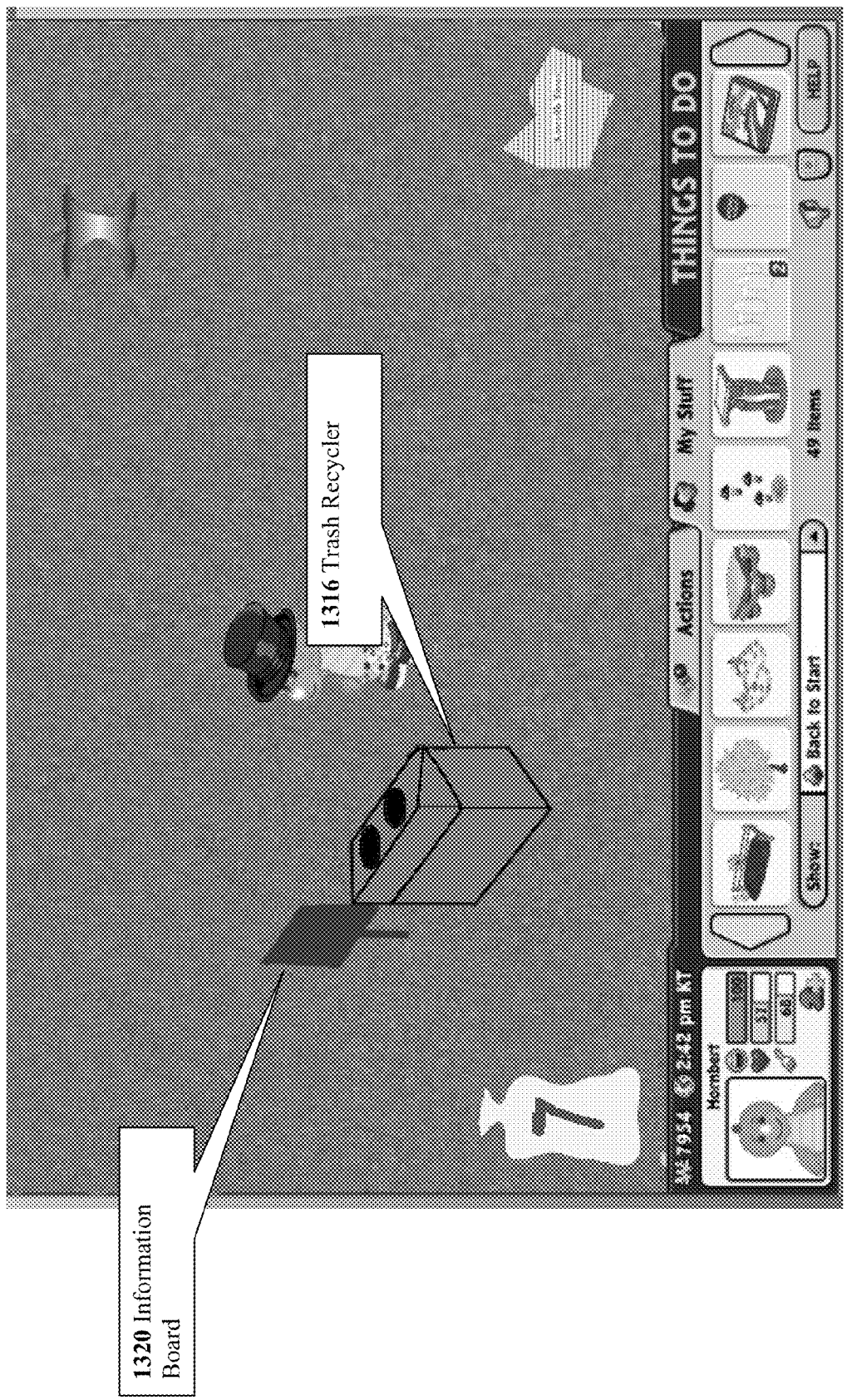

FIG. 13B shows a Trash Recycler and Information Board 1320 in the Park which the user can click on to open the Information Board window. A signpost will appear in its designated locations when this trash collecting feature is added to the park. A trash recycler icon 1316 is provided that the user clicks on to open the Trash Recycler window for disposing of the trash. The system animates the pet walking until it arrives at an open tile adjacent to the trash recycler. The park may have a number of trash recycler locations.

The pet suffers a happiness penalty on a happiness score, and a health penalty on a health score, when they walk through a tile with a piece of trash on it (they should collect it, first). The pet might also be debited Green Points. Walking through trash also triggers a pet portrait tip to appear notifying them that they should have collected the trash.

If the pet passes through multiple tiles with trash on the same walking path to the same tile, then the penalty only occurs once. There is no penalty to the user if the pet starts walking on the trash path before the trash is spawned i.e. pet starts walking on path and trash is spawned along the path, the pet will walk through the tile with a piece of trash without any penalties.

The trash can be spawned randomly throughout the park. The system can choose how much trash to spawn, how often and where to spawn the trash based on a specific algorithm. The algorithm can determine the spawning randomly and/or based on odds assigned to different kinds of trash. The system can check the number of trash items remaining in the virtual park at a predetermined interval (e.g. every ten minutes). When the system performs this check, if the number of trash items falls below a predetermined value (e.g. 30% of maximum), the system automatically spawns new trash.

As discussed above, the user receives "Green Points" for correctly recycling and composting trash. Upon accumulating certain numbers of Green Points, the user gets various virtual items as prizes. The Green Points can also be displayed on a Green Points "widget" on the user's social networking page. This trash collecting system encourages the user to visit the website and the virtual park often to get more Green Points.

When users receive a prize for getting a Green Score, if their points drop below that score and they attain that score again, then they are not given that prize again. All prizes won from this activity can be sold but cannot be traded. The system does not take items back from users, even if their Green Score drops below the score at which they attained the item.

After attaining the final prize, the prizes that are given out start from the beginning again, with the first prize being given out after the user has scored the respective amount of Green Points above the final prize. In this way, users can continually climb the prize ladder, winning each item over and over again, but not too frequently, so that the items are still hard to come by. For example a "Cleanup Kinz T-Shirt" can be awarded to users again when they achieve, for example, a Green Score of 1,400.

Figure 14:
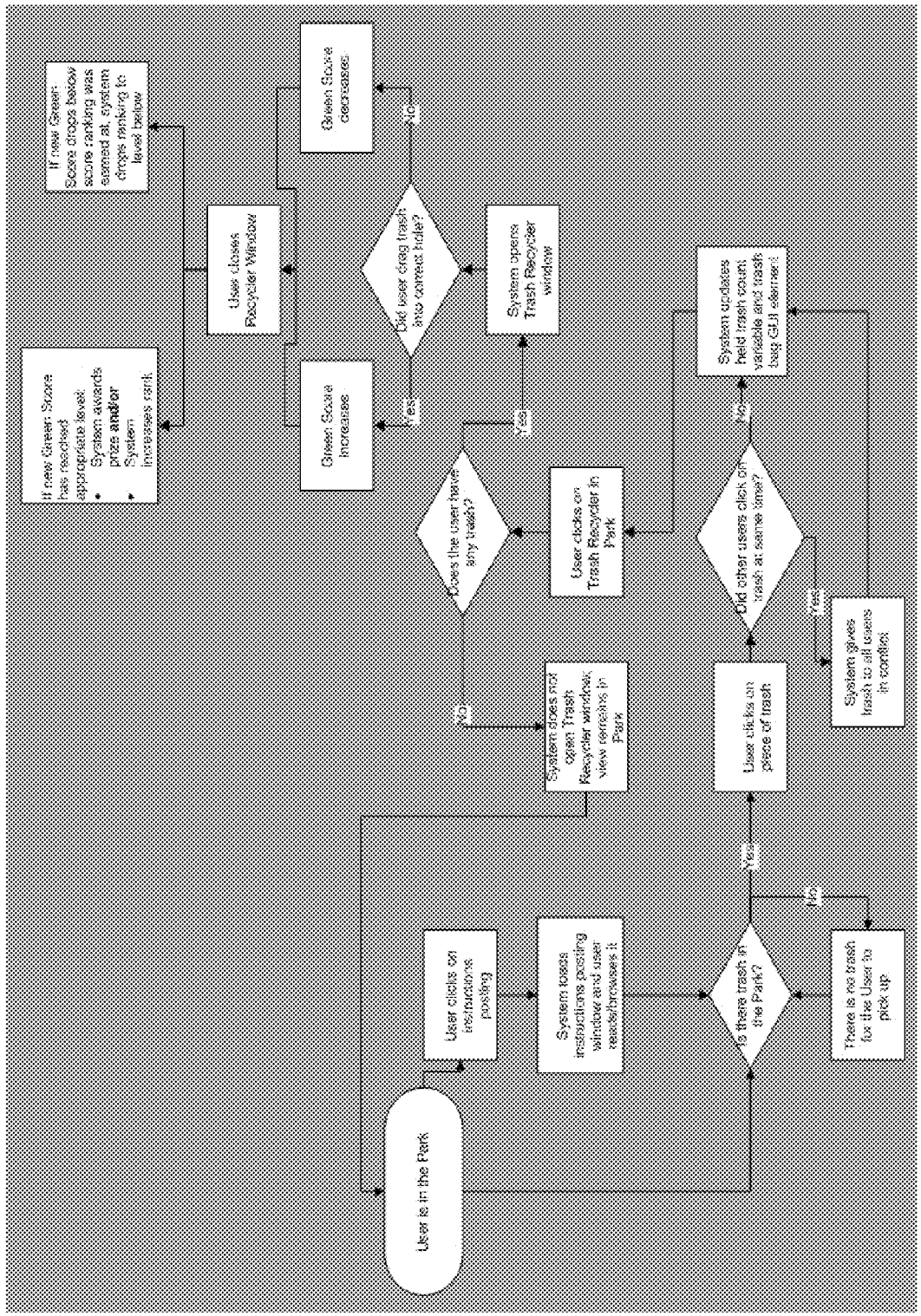
FIG. 14 is a flow chart representing an example of the trash collecting activity.

FIG. 14 shows a flow chart of an example of system processing for such a trash collection feature.

II. Tail Towns™ Embodiment

Figure 15:
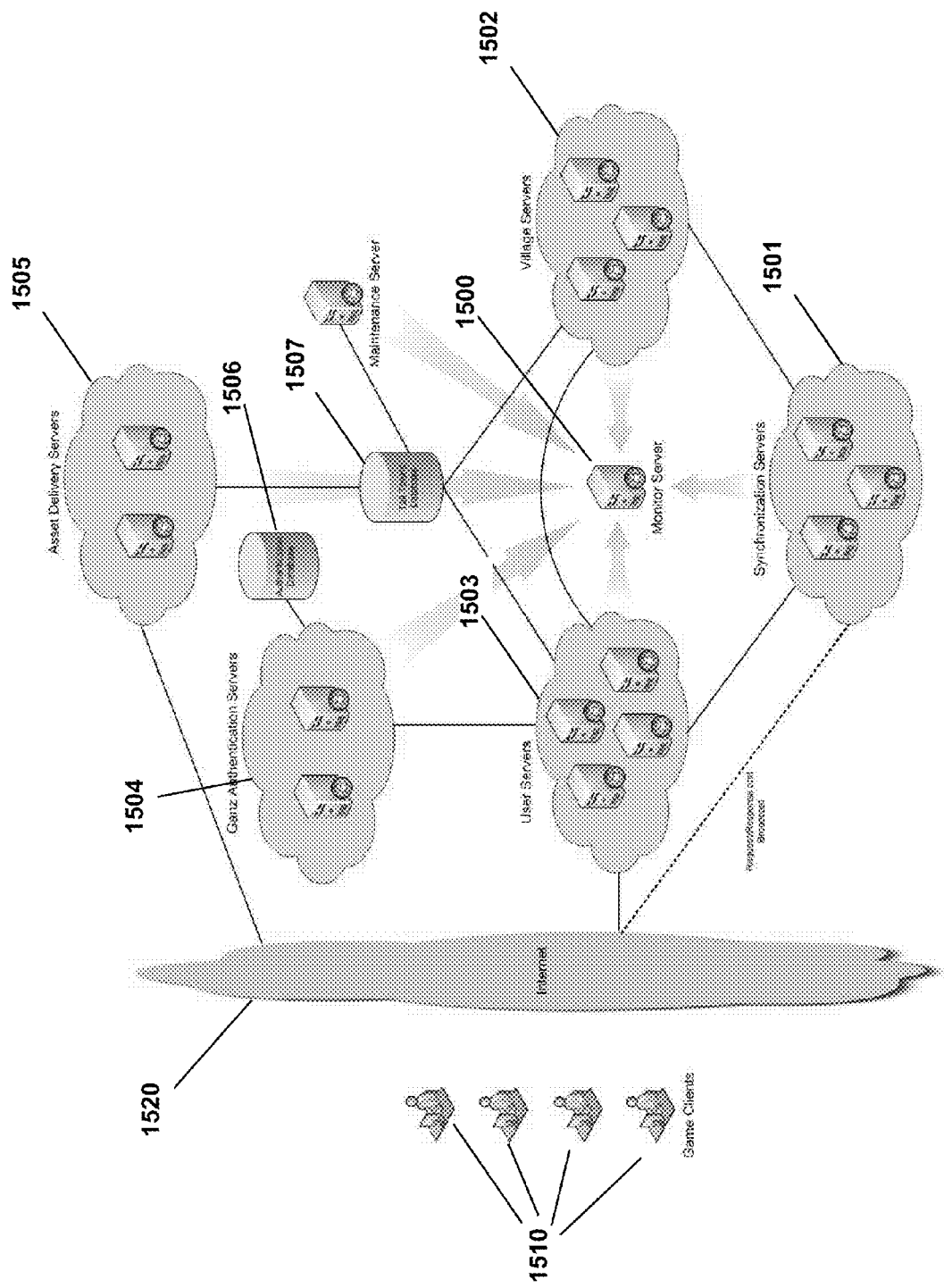
FIG. 15 is a block diagram of another example system.

Another embodiment of an example System related to the more complex virtual world is disclosed in U.S. Provisional Application Ser. No. 61/327,364 is shown in FIG. 15 for implementing a virtual community called "Tail Towns". The system has a Monitor Server 1500 for monitoring the various system servers, one or more synchronization servers 1501 ("sync server"), one or more villager servers 1502, one or more user servers 1503, one or more authentication servers 1504, and one or more asset delivery servers 1505. Of course, these servers could be implemented as virtual servers on one or more physical computers.

The System is supported by a plurality of databases, such as an authentication database 1506, and system database 1507. The system is connected to the Internet 1520 for connection to a plurality of users each using a game client 1510.

The Sync Server 1501 provides the management and communication infrastructure for synchronization of characters, events and environments across the Tail Towns user base.

Figure 16:
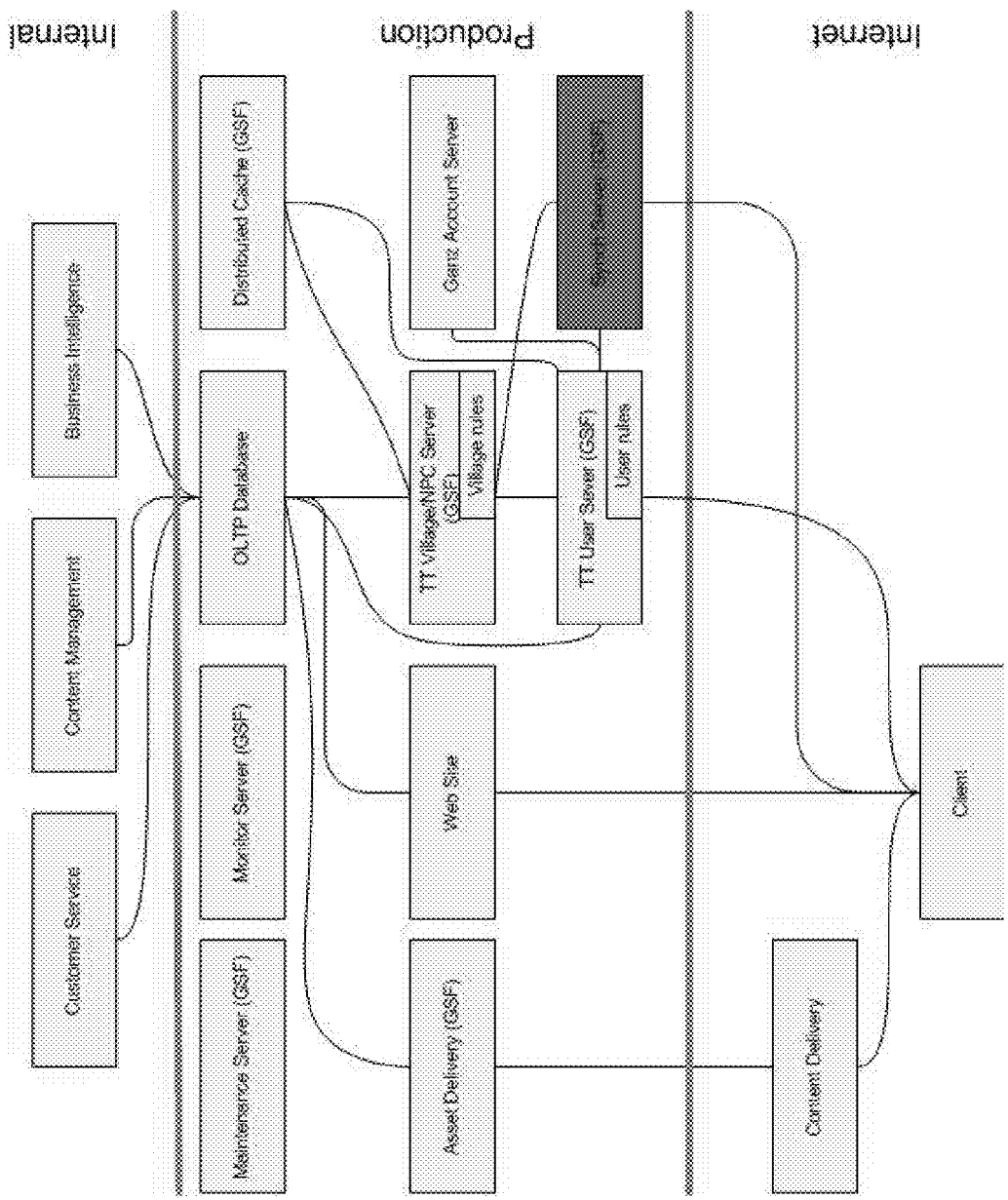
FIG. 16 is a block diagram showing the relationship of various servers o the other example system.

The Tail Towns Sync Server(s) 1501 are a cluster of GSF-based servers, which benefit from the communications support, transaction execution model, data marshalling, server discovery, performance monitoring, and configuration management capabilities inherent in GSF. These servers collectively manage the synchronization of data across all user sessions for the Tail Towns environment. FIG. 16 shows the relationship of the Sync Server to other server clusters in Tail Towns.

Sync Servers distribute messages to clients based on internal filtering rules that are designed to provide meaningful, consistent-over-time exchanges that minimize traffic to the client. Traffic reduction is necessary to ensure that the client isn't overloaded with messages about which it has little or no interest, and to control outbound network utilization.

Each Sync Server manages messages to clients for a set of villages. The grouping by village keeps natural collections of users connected to the same server, thereby encouraging more optimal communication. When clients are chatting with users in other villages, or when transient load rebalancing results in the relocation of users or an entire village, the Sync Server infrastructure automatically forwards messages to the appropriate server. This process allows any Sync Server to act as a proxy for message distribution.

The Sync Server tracks performance statistics and operational data using the GSF monitoring system. This system tracks hundreds of vital server properties including CPU, memory and JVM values at regular intervals. It also tracks detailed information about API calls (such as counts and response times) made from the other servers, communication message counts, and filtering results. All values can be managed, tracked and displayed through the browser-based GSF Monitor tool.

Performance statistics specific to the Sync Server include measurements related to villages, users, and message fan-out. A list of Sync Server performance statistics can be found in Table 1, which lists some of the Sync Server statistics that are collected, in addition to the standard GSF statistics that are computed and disseminated for all servers. This list may change during the course of implementation; for the definitive version, the appropriate Java statistics objects should be consulted. The table below is unordered, but logically-related items are grouped near each other. The prefix field naming convention used follows that of the other GSF instrumentation objects.

TABLE 1

| Name | Description |
| --- | --- |
| tVillageBind | Timestamp of last village bind change |
| iVillages | Number of villages hosted by this server |
| iSplitVillages | Number of split villages hosted by this server |
| iUsers | Number of users hosted by this server |
| iVis | Number of (non-unique) visible users across all user visibility lists |
| qUsersPerVillage | Quantile distribution of users per village |
| mMessagesIn | Moving count of recent messages in |
| mMessagesOut | Moving count of recent messages out |
| mForwards | Moving count of recent messages forwarded to another server in the cluster |

Another important Sync Server-specific statistic is the village load factor (VLF), which is computed for each village hosted by a server. The VLF is a representation of the percentage of time the server spends servicing that particular village. The VLF is disseminated as part of the server allocation protocol, outside of the periodic GSF performance messages.

The Sync Server provides functionality to other servers in the Tail Town complex through an exposed set of APIs. These APIs offer functions for the User and Village Servers, as well as for client browsers running Tail Towns. FIG. 16 shows the relationship of the Sync Server to other server clusters in Tail Towns shown in FIG. 15.

FIG. 15 illustrates the communication paths among Tail Towns servers. Game clients 1510 have communication channels to a User Server 1503 and to a Sync Server 1501. Most of the client's transactional requests are performed through the User Server 1503, which is able to disseminate resulting changes to any affected clients through the Sync Server cluster. Transactions that impact villages are routed by the User Server 1503 to a Village Server 1502, which likewise can disseminate changes through Sync Servers 1501. The Sync Servers 1501 use their direct channels to the clients 1510 for which they have responsibility to fan out and distribute object changes, state changes, player moves and actions, and chat correspondence, as well as system notifications.

The channel between the client 1510 and the Sync Server 1501 also provides a short-circuit up-link path for elementary operations such as moves and emotes. Avoiding having these dominant messages go through a User Server 1503 saves a network hop and reduces contention on the User Servers 1503, both of which serve to improve the overall responsiveness of the game experience.

Client-server connections may be either TCP or reliable UDP via the Internet 1520, according to constraints imposed by network, firewall, and software configuration choices made by the client. Reliable UDP is preferred for the downstream broadcast traffic from the Sync Server 1501, as it has better scaling characteristics and often results in improved transmission speed. However, it is important to support both protocols and to allow the client to participate in the choice of which (or both) to use.

The Sync Server 1501 does not connect to a relational database for the information it requires, and instead queries a User Server 1501 or Village Server 1502 to collect information about users, NPCs or villages that may be needed to drive synchronization and filtering logic. Recognizing the User and Village Servers 1503/1502 as the systems of reference for their respective classes of data allows these other servers to keep updates in DCache or in local memory without committing them to the database. In turn, this model provides excellent flexibility in how data is organized while offering exceptional performance and scaling characteristics.

The Sync Server itself does not need to make use of DCache, since the data classes that it maintains either have servers that act as their systems of reference (as just described), or else is shared across a subset of Sync Servers known precisely to the Sync Server cluster. Moreover, all of the data in the latter category is extremely transient. For this reason, a Sync Server can always obtain synchronization data that it requires from a peer server.

The User Server(s) 1503 makes use of the Sync Server to communicate changes to a player's appearance, location, actions or emotes, and also to pass notifications and chat messages to clients. Various services are supported between these two classes of server.

The Village Server(s) 1502 make use of the Sync Server(s) 1501 to communicate NPC information including scripting and other visual changes. Also, the Village Server 1502 uses the Sync Server 1501 to communicate any updates or additions and deletions to a village to clients including the launching of events and the associated NPC interactions. Various services are supported between these two classes of server.

To perform its core functionality, the Sync Server 1501 works with three main entities: villages, locations, and users. The Sync Server's view of these objects is limited only to the essential pieces of data that are required for its functionality, and may differ from the object model used by the database or other servers.

Associated with any instance of each of these entities is a version number which is updated with each change to the object. When the Sync Server provides entity details to a client, it typically provides the entity's ID and the version number. This allows the client to cache objects locally and request the latest version (via the User Server) only when the Sync Server notifies it of a change in version.

Entity data cached by the Sync Server itself is retained only to the extent that the server requires it to perform its intrinsic functionality. Specifically, the Sync Server does not attempt to keep a cache of all village or user properties for objects that it is mediating. The server may publish updates to objects as a pass-through from a User or Village Server, without needing the complete picture of the entity.

The synchronization for each active village in Tail Towns is managed by one or more Sync Servers, and each Sync Server typically manages synchronization for multiple villages.

For each village currently managed by a Sync Server, the server caches the complete set of NPCs active within the village, and their current task list and paused state. The Village Server is responsible for all additions, removals and changes to NPCs; the Sync Server is responsible only for caching the data, providing a complete snapshot to any connected user that enters the village, and relaying any changes received from the Village Server to any connected users in the village. An example of an expanded village is shown in FIG. 17.

The Sync Server also maintains for each village the set of locations that comprise it, as well as the complete list of all connected users currently in the village.

Figure 17:
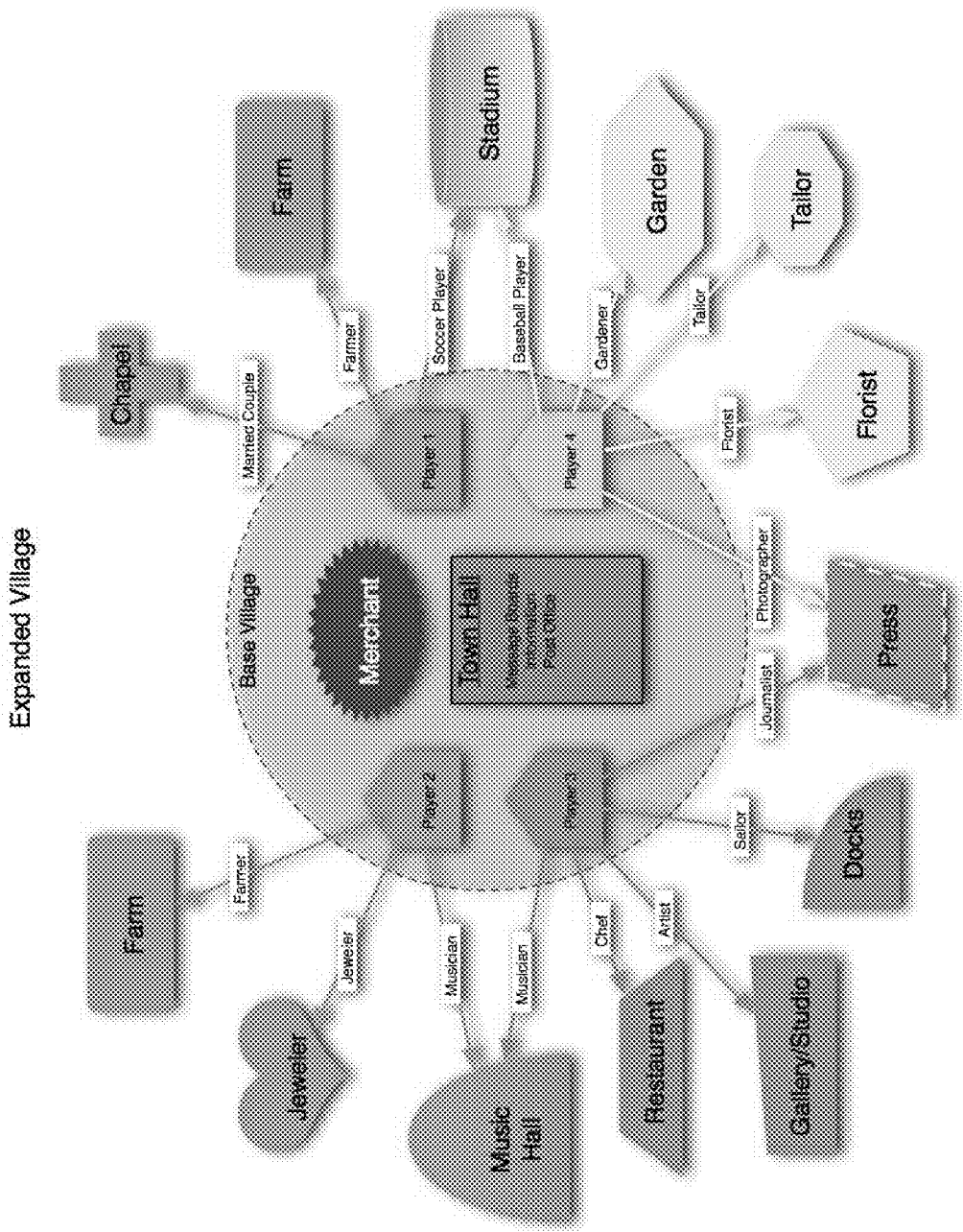
FIG. 17 is a diagram showing an example layout of various common areas in the other example system.

Each village is divided into a number of locations (see FIG. 17). Each room or floor within a building is a location, as is the village's exterior. The Sync Server shows each location is a fixed-size, two-dimensional space. Each village can contain a number of objects at a specific locations (e.g. televisions, sofas, fountains, buildings, etc.), as well a number of users who are often moving within the location. Addition, removal, or change in the position of an object (not a character) within the location is considered a change to the location itself and results in an increment of its version number. This allows a user who has left the location and returned to determine whether its cached version of the location is still valid (as they typically are). Unlike objects, arrival, departure, or movement of a user does not result in an increment in the location's version number.

NPCs, similar to users, also move from location to location and within locations. These movements, however, are scripted well in advance, and their implementation is the responsibility of the client application.

For each location, the Sync Server maintains its length, width, and a complete list of users that are currently within it. The list of users is divided across a set of spatial indices (SIs) that partition the location into a regular grid.

The Sync Server maintains the following data for each user in a village (including those who are connected to other Sync Servers that are co-hosting the village):

List of connected users who can see the user in question. This is the list of users who must be notified of any of this user's movements.

Most-recently calculated SI. This is the spatial index of the last-known location occupied by the user.

Current position or latest movement path

In addition to the general "whereabouts" data above, the Sync Server also maintains the following information, used as inputs into the visibility algorithm (discussed below):

Language ID

Region ID

Home village ID

For users who are connected to the Sync Server, the following additional information is maintained for the purpose of visibility calculations:

List of other users whom this user can see

List of users this user recently saw

List of friends of this user

List of users with whom this user is currently grouped

Tail Towns is unlike many other existing "Massively Multi-Player Online games (MMO's), because Tail Towns takes its inspiration from single player games rather than the combat-heavy item grind of traditional MMO's.

Players come to Tail Towns through either the free option or by purchasing a figurine and getting a code, for example. Both options give the players a customizable Avatar that uniquely represents the player in the world of Tail Towns.

The game provides the ability to collect various objects, decorate their personal avatars, decorate various buildings, rooms, or other objects, allows exploration of the Tail Towns world, playing various games, socializing, building villages, and various content creation.

As a game with a heavy emphasis on social networking, friends are the staple of the community. There are numerous ways to bring existing friends into the game, or to make new friends in the game. Friends can be gathered or met in the game by a variety of ways.

Email Invites. Just as many social networking apps have bots that send automated emails from an existing network of friends in email address books, this can be used to encourage people to bring their friends along. Since Tail Towns has a robust free-to-play mode, this is a potential way of bringing multiple players into the game.

Social Network Apps: By building apps with major social networking applications such as Facebook or Myspace, a crossover can be brought to the world of Tail Towns. For example, a 2D Avatar representative and simple Apartment Flat may exist on Facebook. This free app is tied to the Tail Towns server, so the system knows what items and customizations a user has. This app has a button that takes the player to the Tail Towns site as soon as they wish to play with a more robust 3D version (which takes them into our game environment for potential sales).

Communication: Any communication with another player in the game will include an option to add this user as a friend. If the other player accepts, then both will have a new friend in their Friends List.

Playing Games: Playing games with other players will put them on a temporary 'Recently Played With' list. Any of these people can be converted to a Friend quite easily by selecting their name and the option to add them to their friends list.

Inviting to a Village: Any player can give an invitation to another player to visit their village. Just like the 'Recently Played With' list, players who have visited their village will also be on a temporary list for a limited time. While those players are on this list, they can be added permanently to the user's Friends List.

Village Mates: Any other player who lives in a user's village will automatically be added to the user's Friends list.

To help bring players together, the game will have visible and invisible Matchmaking systems that are designed to help bring players together in the hope of building and strengthening friendships.

Friends List: Each player has a Friends List that is easily accessible. Because, like Social Networking Apps, this Friends List can fill up quite easily, there are sorted categories to help players manage the friends that they have.

Invitees: Invitees are kept in a separate list, which may contain a limited number or the most recent invitees to visit a player's village. Players may give invitations (shown as an envelope) to any player.

Once an invitation is given and received, the players are listed in each other's Invitee list for a period of time. If the invitation is held and used later, the Invitee List is refreshed with the players for a limited time. Of course, while a player is in the Invitee List, they may request to be added to the more permanent Friends List during the duration of the Invitee period.

Recently Played With: Recently Played With players are also kept in a separate list, just as Invitees are. This is also a time-limited list, and gives players a chance to reconnect with other players that they previously enjoyed playing with. Before the Recently-Played-With List has eliminated the other player from being listed, either or both players may choose to add that player, to their group of Friends.

Village Mates: As soon as players form a village together, all other Village Mates will be automatically added to each other's Friends List. If and when villagers choose to leave or disband a village, they will be strangers again and will need to manually add each other to their Friends List. This is done to give players an option of leaving bad village mates behind without their whereabouts and activities being instantly accessible.

Friends of Friends: This list of friends will be hidden from the player, but will be accessible by the server and its Matchmaking algorithms. Friends of Friends will be tracked by a number of degrees of separation.

This data is used for a number of Matchmaking functions to bring people who know other people together. By filling in the gaps between the degrees of separation, a web of interactions can be created that seem almost 'uncanny' to the user how the person they might have played a seemingly 'random' multiplayer match was a friend of one of their good friends. Although some of these potential friendships may fizzle out, it is very likely that others will turn into strong friendships, strengthened by the fact that they now know common people.

One of the core functions of the Sync Server is to relay changes in the game world to connected users, to ensure that all users have a synchronized view of the Tail Towns world. A notable source of change is player movement within a location. While the Sync Server sends notifications only to users who are in the same location as the object that has generated the change, the limited resources of both the client and server (as well as the network between them) coupled with the potential for very busy locations within Tail Towns necessitate that some players and NPCs occasionally be filtered from the view of the location presented to the user.

Filtering is implemented on both the client and server. Server-side filtering is primarily used to reduce the potentially high-bandwidth stream of arrivals and movements of characters that are of little or no relevance to a particular user. Client-side filtering is employed to limit the graphical rendering processing expended by the client application so that it is proportional to the specific capabilities of the client hardware.

The data required to perform filtering is cached by the Sync Server and generally updated periodically through background agents. This data typically consists of scalar properties and lists of users, organized by user and location. Because the data is designed to support local-to-this-server decisions, it encapsulates a local view of a village. Some properties, such as the list of users in a village, are maintained globally, but the detailed knowledge of users is strictly local. In this way, data maintenance and sharing is handled optimally.

When a user enters a location, the list of users whom the newcomer can see is computed immediately and synchronously, rather than waiting for the next iteration of the appropriate background agent.

Server-side filtering for a given user begins with a rough proximity sort. Any characters determined to be "far" from the user are immediately filtered from the update stream, regardless of their relevance to the user. Any users determined to be "near" the user are candidates to be included in the update stream, subject to relevance filtering. Any characters located within a spatial index of which any portion can be seen by the client (assuming the longest camera setting) is considered "near;" all others are considered "far." For a simplified approach, no further weighting based on proximity is considered by the server-side filtering mechanism. Favoring characters based on relative proximity could be supported by providing significantly more CPU resources, but could tend to produce a claustrophobic user experience.

Beyond proximity, the Sync Server does not typically include the user's field of vision into its filtering criteria. In particular, the user's current angle of rotation (i.e. the direction in which the player is looking) is not considered, as this value can change very quickly and demand much more frequent calculations of the visibility list. Occluded users and objects are also typically not filtered, as the Sync Server is not running a complete game simulation and is therefore not in a position to perform line-of-sight, collision detection, or pathfinding calculations.

Once the partition of nearby candidates has been determined, each is given a relative weight according to the criteria described below. These criteria are presented most to least relevant for the Tail Towns example:

Talking/interacting. Characters with whom the user is currently grouped or is actively chatting.

NPCs of importance. Crucial NPCs (e.g. quest givers, etc.).

Friends. Characters controlled by friends of the user.

Village mates. Characters controlled by users with the same home village (excluding Starter Town).

Currently seen. Characters currently visible to the user. In order to provide a sense of temporal consistency, the filtering mechanism biases toward keeping currently-seen users in the update list, even if another character of marginally-greater relevance has arrived.

Friends of friends. Characters controlled by friends of the user's friends;

Recent interest. Characters who were recently seen by the user (temporal consistency).

Can see me. Characters who can see the user (mutual consistency).

Regional language/dialect. Characters who speak the same dialect as the user.

Language. Characters who speak the same language as the user, but possibly a different dialect of it.

Region/locale. Characters from the same part of the world as the user.

After the weight for each candidate has been calculated, the top n (where n is the target number of visible users) are chosen and become the new list of visible users. For each user who has been added to the visibility list, and each user who has been removed from it, the inverted visibility lists associated with that user are also updated. Clients are notified of additions and removals to and from their visibility lists, as well as changes in the weight associated with a visible user, via AddPlayerNotify, RemovePlayerNotify, and ChangeWeightNotify messages, respectively.

When a user V is added to user U's visibility list, and U and V are hosted by the same Sync Server, U is reciprocally added to V's visibility list immediately with a low filtering weight, provided V does not exceed its target number of visible users. This ensures a timely mutual consistency for sparsely-occupied villages (those where gaps in consistency would be most likely to be noticed).

Figure 18:
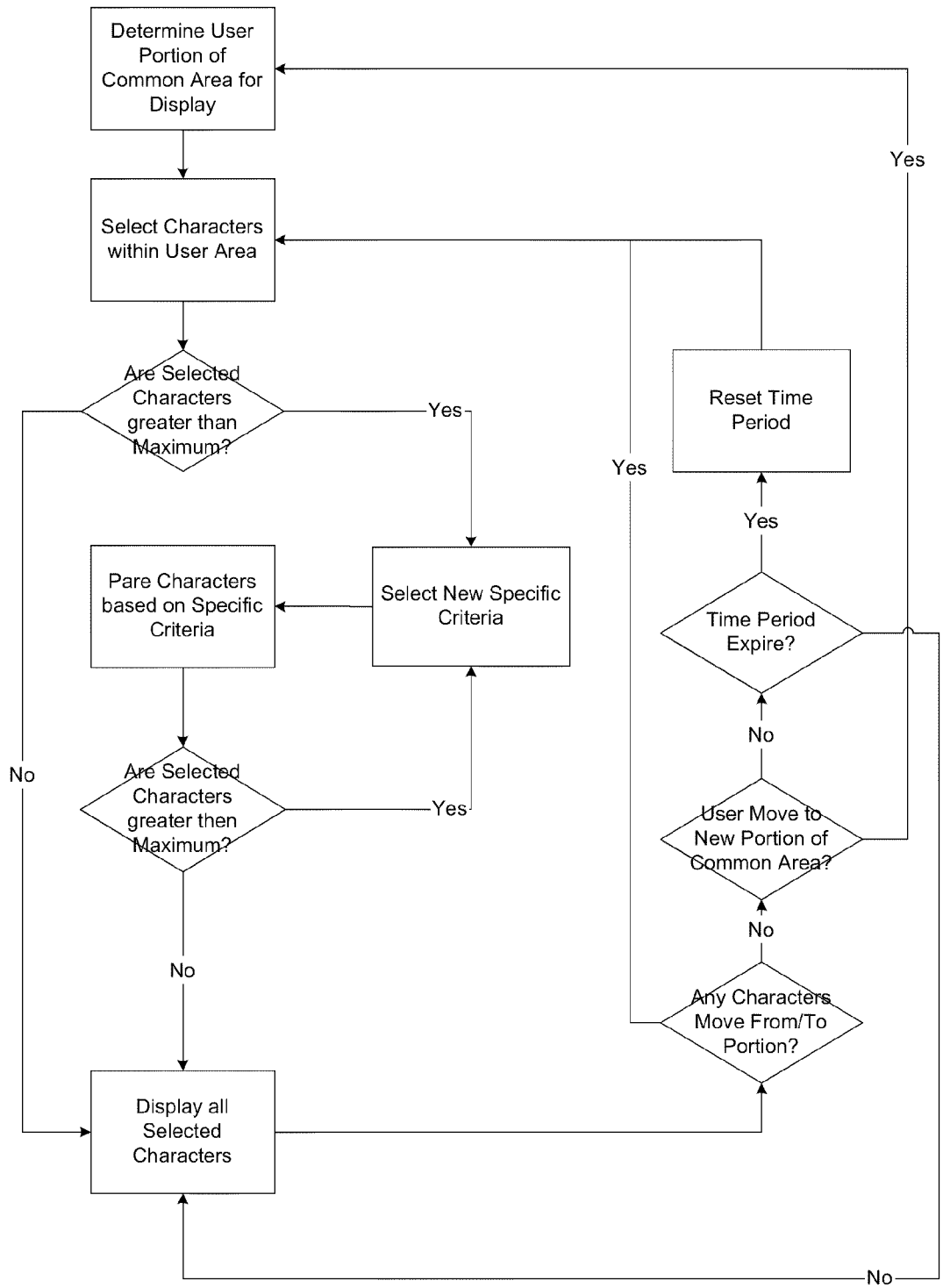
FIG. 18 is a flow chart of another example method of selecting a subset of characters in a portion of the example common area for display.

FIG. 18 is a flow chart showing a simplified version of the above method of determining character visibility.

Most types of server interaction initiated by the client are directed to the User Server. Because the User Server has a complete view of the user's state, inventory, and relationship with other users and villages, its business logic is uniquely in a position to vet incoming requests and to reject those that are deemed inappropriate. This can include taking action if a hacked client application is suspected.

Unlike the User Server, the Sync Server has a very limited view of the state of a user and is unaware of most of the ways in which a user is interacting with the Tail Towns world. The Sync Server is, however, the authority with respect to where a user is positioned within a particular location, and is the only server situated to perform any form of validation as a user moves from position to position within a location. In particular, the Sync Server can detect any movements that are perceived to be discontinuous ("teleports"), implausibly fast ("speeding"), or fall outside of the bounds of the location. If a validation test is computationally complex, the Sync Server may choose to perform it on a periodic spot-check basis.

Each Sync Server is responsible for handling a community of users (unique across the Sync Server cluster), and one or more villages (which may or may not be unique across the cluster). Ideally, users are distributed among Sync Servers based solely on the distribution of villages, with the aim being to keep users who are in the same village aggregated on the same Sync Server. The Sync Server assignment is determined by collusion with the sponsoring User Server at login time, and is re-evaluated periodically and whenever the user navigates to a different village.

Load balancing algorithms and management are similar to those employed by the Village Server, with the notable exception that multiple Sync Servers may share the load of a village by partitioning the user community associated with that village. Most changes in the load management approach between the Sync Server and the Village Server emanate from this difference. A corollary of this is that Sync Server village binding needs to consider the village as well as the user.

Thus, the Tail Towns example provides a much more complicated algorithm for determining what other user's avatars an individual sees than Webkinz®. Additional details are provided in the priority document U.S. Provisional Application Ser. No. 61/327,364, incorporated by reference.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

What is claimed is:

1. A method for providing characters for efficient display in a common room of an online entertainment system including at least one server, said method comprising the steps of:

providing a common area for participation by a plurality of characters engaging in the online entertainment system, said plurality of characters including a specific character of a particular user;

receiving input which enables selecting a portion of said common area for display to said particular user using said server;

using a computer processor provided to the at least one server, determining a set of local characters from said plurality of characters that are stored in said server and are linked to users, wherein said set of local characters are characters that are present in said portion of said common area;

using said computer processor provided to the at least one server, analyzing information in said server that is linked to said set of local characters or linked to a corresponding user of said set of local characters for matching a selected criteria linked to said specific character or linked to said particular user;

using said computer processor provided to the at least one server, determining a subset of said set of local characters for display to said particular user as being present in said portion of said common area, wherein said subset is generated using said selected criteria to determine said subset from said set and where said subset includes fewer characters than said set and is selected to be less than or equal to a predetermined maximum number of characters for display in a particular display area;

using said computer processor provided to the at least one server, further determining said subset of said set of local characters for display to said particular user as being present in said portion of said common area by also using another selected criteria to determine said subset if the subset determined by using said selected criteria is more than said maximum to further reduce the number of characters in said subset to be at or below said maximum;

and said server outputting data for displaying said subset of said set of local characters to a user computer associated with said particular user, wherein said data has said subset of said set of local characters for display on the user computer with fewer characters than said set of local characters, thereby resulting in displaying less than all of those of said plurality of characters that are present in said portion of said common area.

2. The method of claim 1, wherein said selected criteria includes whether each one of said characters or their corresponding user is on a friend's list of said specific character or said particular user.

3. The method of claim 1, wherein said subset of said set of local characters for display includes said specific character.

4. The method of claim 1, wherein, if said subset of said set of local characters for display to said particular user is less than said maximum, said server selects additional character(s) from said set of local characters for providing in said subset such that the number of characters provided in said subset is equal to said maximum.

5. The method of claim 4, wherein said additional character(s) are selected from said set of local characters using another selected criteria.

6. The method of claim 4, wherein said additional character(s) are randomly selected from said set of local characters by said server.

7. The method of claim 1, wherein, for a different particular user using a different specific character in said portion of said common area, said server outputs data for displaying a different subset of said set of local characters to the user computer associated with said different particular user, said different subset having at least one character different than the characters of said subset.

8. The method of claim 1, wherein said server updates said subset on a periodic basis to accommodate changes in the set of local characters due to one or more of said plurality of characters arriving, leaving, or arriving and leaving from said portion of said common area.

9. The method of claim 1, wherein said server updates said subset to accommodate changes in the set of local characters due to said specific character moving out of a previous portion of said common area to a new portion of said common area and/or due to other characters of said set of local characters moving into or out of said portion of said common area, wherein said subset is determined based on those of said set of local characters found in the portion of said common area where said specific character is currently present.

10. The method of claim 1, further comprising the step of further determining said subset of said set of local characters for display to said particular user as being present in said portion of said common area by also using another selected criteria to determine said subset.

11. A method for providing characters for efficient display in a common room of an online entertainment system including at least one server, said method comprising the steps of:
provinding a common area for participation by a plurality of characters engaging in the online entertainment system, said plurality of characters including a specific character of a particular user;
receiving input which enables selecting a portion of said common area for display to said particular user using said server;
using a computer processor provided to the at least one server, determining a set of local characters from said plurality of characters that are stored in said server and are linked to users, wherein said set of local characters are characters that are present in said portion of said common area;
using said computer processor provided to the at least one server, analyzing information in said server that is linked to said set of local characters or linked to a corresponding user of said set of local characters for matching a selected criteria linked to said specific character or linked to said particular user;
using said computer processor provided to the at least one server, determining a subset of said set of local characters for display to said particular user as being present in said portion of said common area, wherein said subset is generated using said selected criteria to determine said subset and is selected to be less than or equal to a predetermined maximum number of characters for display in a particular display area;
using said computer processor provided to the at least one server, further determining said subset of said set of local characters for display to said particular user as being present in said portion of said common area by also using another selected criteria to determine said subset in response to a determination that the subset determined by using said selected criteria is more than said maximum to further reduce the number of characters in said subset to be at or below said maximum;
said server outputting data for displaying said subset of said set of local characters to a user computer associated with said particular user;
updating said subset on a periodic basis to accommodate changes in the set of local characters due to one or more of said plurality of characters arriving and/or leaving from said portion of said common area; and
regularly updating said subset to accommodate changes in the set of local characters due to said specific character moving out of a previous portion of said common area to a new portion of said common area and/or due to other characters of said set of local characters moving into or out of said portion of said common area, wherein said subset is determined based on those of said set of local characters found in the portion of said common area where said specific character is currently present, wherein said subset of said set of local characters for display on the user computer has fewer characters than said set of local characters, thereby resulting in displaying less than all of those of said plurality of characters that are present in said portion of said common area, wherein for a different particular user using a different specific character in said portion of said common area, said server outputs data for displaying a different subset of said set of local characters to the user computer associated with said different particular user, said different subset having at least one character different than the characters of said subset.

12. The method of claim 11, wherein said selected criteria includes whether each one of said characters or their corresponding user is on a friend's list of said specific character or said particular user.

13. The method of claim 11, further comprising the step of further determining said subset of said set of local characters for display to said particular user as being present in said portion of said common area by also using another an additional selected criteria to determine said subset only if the subset determined by using said selected criteria is less than said maximum.

14. The method of claim 13, wherein additional character(s) are selected for inclusion in said subset from said set of local characters using another said additional selected criteria.

15. The method of claim 13, wherein additional character(s) are randomly selected from said set of local characters by said server.

* * * * *